(12) United States Patent
Fan et al.

(10) Patent No.: US 11,716,491 B2
(45) Date of Patent: Aug. 1, 2023

(54) SCALING PROCESS FOR CODING BLOCK

(71) Applicants: Beijing Bytedance Network Technology Co., Ltd., Beijing (CN); Bytedance Inc., Los Angeles, CA (US)

(72) Inventors: Kui Fan, San Diego, CA (US); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/696,654

(22) Filed: Mar. 16, 2022

(65) Prior Publication Data
US 2022/0210481 A1  Jun. 30, 2022

Related U.S. Application Data

(63) Continuation of application No. PCT/CN2020/116471, filed on Sep. 21, 2020.

(30) Foreign Application Priority Data

Sep. 20, 2019  (WO) ............... PCT/CN2019/106925

(51) Int. Cl.
*H04N 11/02* (2006.01)
*H04N 19/96* (2014.01)
(Continued)

(52) U.S. Cl.
CPC ........... *H04N 19/96* (2014.11); *H04N 19/119* (2014.11); *H04N 19/132* (2014.11);
(Continued)

(58) Field of Classification Search
CPC ..................................................... H04N 19/96
(Continued)

(56) References Cited

U.S. PATENT DOCUMENTS

| 9,838,662 B2 | 12/2017 | Zhang et al. |
| 9,860,540 B2 | 1/2018 | Wang et al. |

(Continued)

FOREIGN PATENT DOCUMENTS

| CN | 106664425 A | 5/2017 |
| CN | 107852503 A | 3/2018 |

(Continued)

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

(Continued)

*Primary Examiner* — Leron Beck
(74) *Attorney, Agent, or Firm* — Perkins Coie LLP

(57) ABSTRACT

Methods, systems, and devices for luma mapping with chroma scaling for video and image coding are disclosed. An example method of video processing includes performing, for a current region comprising a luma block, a first chroma block, and a second chroma block, a conversion between the current region of a video and a bitstream representation of the video according to a rule that specifies an order in which, during decoding, the first chroma block and the second chroma block are processed based on mapped sample values of the luma block.

20 Claims, 25 Drawing Sheets

1700

Determining, for a conversion between a current block of a video and a bitstream representation of the video, whether a vertical binary tree partitioning is applicable to the current block based on a size of the current block, a size of a virtual pipeline data unit configured for the current block, and a maximum size of a transform block configured for the current block — 1710

Performing, based on the determined, the conversion — 1720

(51) Int. Cl.
H04N 19/119 (2014.01)
H04N 19/146 (2014.01)
H04N 19/176 (2014.01)
H04N 19/436 (2014.01)
H04N 19/132 (2014.01)
H04N 19/186 (2014.01)
H04N 19/30 (2014.01)
H04N 19/70 (2014.01)

(52) U.S. Cl.
CPC ......... *H04N 19/146* (2014.11); *H04N 19/176* (2014.11); *H04N 19/186* (2014.11); *H04N 19/30* (2014.11); *H04N 19/436* (2014.11); *H04N 19/70* (2014.11)

(58) Field of Classification Search
USPC .................................. 375/240.01–240.29
See application file for complete search history.

(56) References Cited

U.S. PATENT DOCUMENTS

| | | | |
|---|---|---|---|
| 10,057,578 | B2 | 8/2018 | Rapaka et al. |
| 10,484,712 | B2 | 11/2019 | Zhang et al. |
| 10,652,575 | B2 | 5/2020 | Zhang et al. |
| 10,939,128 | B2 | 3/2021 | Zhang et al. |
| 2013/0321674 | A1 | 12/2013 | Cote et al. |
| 2017/0150176 | A1 | 5/2017 | Zhang et al. |
| 2017/0374384 | A1 | 12/2017 | Xiu et al. |
| 2018/0103268 | A1* | 4/2018 | Huang ............... H04N 19/91 |
| 2018/0109812 | A1* | 4/2018 | Tsai ............... H04N 19/157 |
| 2018/0146211 | A1 | 5/2018 | Zhang et al. |
| 2018/0220138 | A1 | 8/2018 | He et al. |
| 2019/0045184 | A1 | 2/2019 | Zhang et al. |
| 2019/0149836 | A1* | 5/2019 | Moon ............... H04N 19/157 375/240.16 |
| 2019/0166382 | A1 | 5/2019 | He et al. |
| 2019/0246143 | A1 | 8/2019 | Zhang et al. |
| 2019/0273931 | A1* | 9/2019 | Lim ............... H04N 19/119 |
| 2020/0036992 | A1* | 1/2020 | Lim ............... H04N 19/13 |
| 2020/0252619 | A1 | 8/2020 | Zhang et al. |
| 2020/0288173 | A1 | 9/2020 | Ye et al. |
| 2020/0304789 | A1* | 9/2020 | Zhao ............... H04N 19/18 |
| 2020/0329257 | A1 | 10/2020 | Zho et al. |
| 2020/0359051 | A1 | 11/2020 | Zhang et al. |
| 2020/0366910 | A1 | 11/2020 | Zhang et al. |
| 2020/0382769 | A1 | 12/2020 | Zhang et al. |
| 2021/0044828 | A1* | 2/2021 | Pham Van ............... H04N 19/176 |
| 2021/0152837 | A1 | 5/2021 | Zhang et al. |
| 2021/0211681 | A1 | 7/2021 | Zhang et al. |
| 2021/0258571 | A1 | 8/2021 | Zhang et al. |
| 2021/0258572 | A1 | 8/2021 | Zhang et al. |
| 2021/0392324 | A1 | 12/2021 | Wang et al. |
| 2021/0392381 | A1 | 12/2021 | Wang et al. |
| 2022/0007021 | A1* | 1/2022 | Jang ............... H04N 19/159 |
| 2022/0210453 | A1 | 6/2022 | Fan et al. |

FOREIGN PATENT DOCUMENTS

| | | | |
|---|---|---|---|
| WO | 2016120209 | A1 | 8/2016 |
| WO | 2019194463 | A1 | 10/2019 |
| WO | 2020018267 | A1 | 1/2020 |
| WO | 2020176459 | A1 | 9/2020 |
| WO | 2020177663 | A1 | 9/2020 |
| WO | 2020197996 | A1 | 10/2020 |

OTHER PUBLICATIONS

Chen et al "Algorithm Description for Versatile Video Coding and Test Model 4 (VTM 4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M1002, 2019.

Chen et al. "Algorithm Description for Versatile Video Coding and Test Model 5 (VTM 5)," Joint Video Experts Team (JVET)of ITU-T SG 16 WP 3 and ISO/IEC JTC 1/SC 29/WG 11 14th Meeting: Geneva, CH, Mar. 19-27, 2019, document JVET-N1002, 2019.

Francois et al. "Description of Core Experiment 12 (CE12): Mapping Functions," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0032, 2018.

Francois et al. "CE12: Summary Report on Mapping Functions," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0032, 2019.

Koo et al. "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0133, 2018.

Lainema, Jani, "CE7: Joint Coding of Chrominance Residuals (CE7-1)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0054, 2019.

Lin et al. "AHG16: Subblock-Based Chroma Residual Scaling," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0113, 2019.

Lu et al. "CE12: HDR In-loop Reshaping (CE12-5, 12-6, 12-7 and 12-8)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0308, 2018.

Lu et al. "CE12-related: Universal Low Complexity Reshaper for SDR and HDR Video," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0247, 2018.

Salehifar et al. "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0099, 2018.

Ye et al. "On Luma Mapping with Chroma Scaling," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0477, 2019.

Zhao et al. "On Luma Dependent Chroma Residual Scaling of In-Loop Reshaper," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0299, 2019.

https://vcgit.hhi.fraunhofer.de/jvet/VVCSoftware_VTM/tags/VTM-2.1.

International Search Report and Written Opinion from International Patent Application No. PCT/CN2020/116470 dated Dec. 25, 2020 (11 pages).

International Search Report and Written Opinion from International Patent Application No. PCT/CN2020/116471 dated Dec. 1, 2020 (10 pages).

Notice of Allowance from U.S. Appl. No. 17/696,681 dated Jun. 7, 2022.

Chen et al. "Algorithm Description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2002, 2019.

Extended Search Report for European Patent Application No. 20864451.8 dated Oct. 10, 2022 (10 pages).

Examination Report mailed from Indian Patent Application No. 202247015018 dated Sep. 7, 2022 (8 pages).

Hsu et al. "CE1-Related: Constraint for Binary and Ternary Partitions," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0556, 2018. (cited in cited in JP2022-517726 OA dated Feb. 21, 2023).

Lu et al. "CE12: Mapping Functions (Test CE12-1 and CE12-2)," Joint Video Experts Team (JVET) of ITU-T SG 16 WP 3 and ISO/IEC JTC 1/SC 29/WG 11 13th Meeting, Marrakech, MA Jan. 9-18, 2019, document JVET-M0427, 2019. (cited in EP20866418.5 EESR dated Jan. 30, 2023).

(56) References Cited

OTHER PUBLICATIONS

Lu et al. "AHG16: Simplification of Reshaper Implementation," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0220, 2019. (cited in JP2022-517727 OA dated Feb. 28, 2023).

Lu et al. "Non-CE2: Alternative Solutions for Chroma Residual Scaling Factors Derivation for Dual Tree," JVET—O0429, Gothenburg, 2019. document JVET-00429. (cited in JP2079-517727 OA dated Feb. 28, 2023).

Zhao et al. "CE2-related: No. latency LMCS Chroma Residual Scaling for Single tree and Dual Tree," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-00232, 2019. (cited in JP2022-517727 OA dated Feb. 28, 2023).

Extended Search Report for European Patent Application No. 20866418.5 dated Jan. 30, 2023 (12 pages).

\* cited by examiner

SPLIT_BT_VER

SPLIT_BT_HOR

SPLIT_TT_VER

SPLIT_TT_HOR

SCALING PROCESS FOR CODING BLOCK

CROSS-REFERENCE TO RELATED APPLICATION

This application is a continuation of International Patent Application No. PCT/CN2020/116471, filed on Sep. 21, 2020, which claims the priority to and benefits of International Patent Application No. PCT/CN2019/106925 filed on Sep. 20, 2019. All the aforementioned patent applications are hereby incorporated by reference in their entireties.

TECHNICAL FIELD

This patent document relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which luma mapping and chroma scaling are used.

In one example aspect a method of video processing is disclosed. The method includes performing, for a current region comprising a luma block, a first chroma block, and a second chroma block, a conversion between the current region of a video and a bitstream representation of the video according to a rule that specifies an order in which, during decoding, the first chroma block and the second chroma block are processed based on mapped sample values of the luma block.

In another example aspect a method of video processing is disclosed. The method includes performing, for a current region comprising a luma block, a first chroma block, and a second chroma block, a conversion between the current region of a video and a bitstream representation of the video, wherein the conversion comprises a joint coding of chroma residuals (JCCR) operation, wherein the first chroma block and the second chroma block corresponds to a first chroma color component of the video and a second chroma color component of the video, respectively, and wherein the JCCR operation comprises a residual or coefficient scaling processes that uses a shifting operation with an input corresponding to a value of the first chroma color component and an output corresponding to a derived value of the second chroma color component.

In yet another example aspect a method of video processing is disclosed. The method includes determining, for a conversion between a current block of a video and a bitstream representation of the video, whether a vertical binary tree partitioning is applicable to the current block based on a size of the current block, a size of a virtual pipeline data unit (VPDU) (denoted VpduSize) configured for the current block, and a maximum size of a transform block (denoted MaxTbSize) configured for the current block, and performing, based on the determined, the conversion.

In yet another example aspect a method of video processing is disclosed. The method includes determining, for a conversion between a current block of a video and a bitstream representation of the video, whether a horizontal binary tree partitioning is applicable to the current block based on a size of the current block, a size of a virtual pipeline data unit (VPDU) (denoted VpduSize) configured for the current block, and a maximum size of a transform block (denoted MaxTbSize) configured for the current block, and performing, based on the determined, the conversion.

In yet another example aspect a method of video processing is disclosed. The method includes determining, for a conversion between a current block of a video and a bitstream representation of the video, whether a vertical ternary tree partitioning is applicable to the current block based on a size of the current block, a size of a virtual pipeline data unit (VPDU) (denoted VpduSize) configured for the current block, a maximum size of a transform block (denoted MaxTbSize) configured for the current block, and a maximum ternary tree size (denoted maxTtSize) configured for the current block, and performing, based on the determined, the conversion.

In yet another example aspect a method of video processing is disclosed. The method includes determining, for a conversion between a current block of a video and a bitstream representation of the video, whether a horizontal ternary tree partitioning is applicable to the current block based on a size of the current block, a size of a virtual pipeline data unit (VPDU) (denoted VpduSize) configured for the current block, a maximum size of a transform block (denoted MaxTbSize) configured for the current block, and a maximum ternary tree size (denoted maxTtSize) configured for the current block, and performing, based on the determined, the conversion.

In yet another example aspect a method of video processing is disclosed. The method includes performing a conversion between a chroma block of a video and a bitstream representation of the video, wherein a residual of the chroma block is scaled by a scaling factor that is determined according to a rule that specifies that the scaling factor is determined without accessing information of a particular luma region.

In yet another example aspect a method of video processing is disclosed. The method includes performing, for a current block comprising a chroma coding unit (CU), a conversion between the current block of a video and a bitstream representation of the video according to a rule, wherein the rule specifies a derivation method for a plurality of scaling factors applied to residuals of a plurality of chroma samples of the chroma CU, and wherein the derivation method is independent of whether the chroma CU is further split into multiple transform units (TUs) for the conversion.

In yet another example aspect a method of video processing is disclosed. The method includes performing, for a current block comprising a chroma coding unit (CU), a conversion between the current block of a video and a bitstream representation of the video according to a rule, wherein the rule specifies whether a chroma residual scaling operation is enabled when the chroma CU is split into multiple transform units (TUs).

In yet another example aspect, the above-described method is embodied in the form of processor-executable code and stored in a computer-readable program medium.

In yet another example aspect, a device that is configured or operable to perform the above-described method is disclosed. The device may include a processor that is programmed to implement this method.

In yet another example aspect, a video decoder apparatus may implement a method as described herein.

The above and other aspects and features of the disclosed technology are described in greater detail in the drawings, the description and the claims.

DETAILED DESCRIPTION

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Summary

This document is related to video coding technologies. Specifically, it is related to chroma scaling in video coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 6) could be found at:

http://phenix.it-sudparis.eu/jvet/doc_end_user/documents/15_Gothenburg/wg11/JVET-O2001-v14.zip The latest reference software of VVC, named VTM, could be found at:

https://vcgit.hhi.fraunhofer.de/jvet/VVCSoftware_VTM/tags/VTM-2.1

2.1. Coding Flow of a Typical Video Codec

Figure 1:
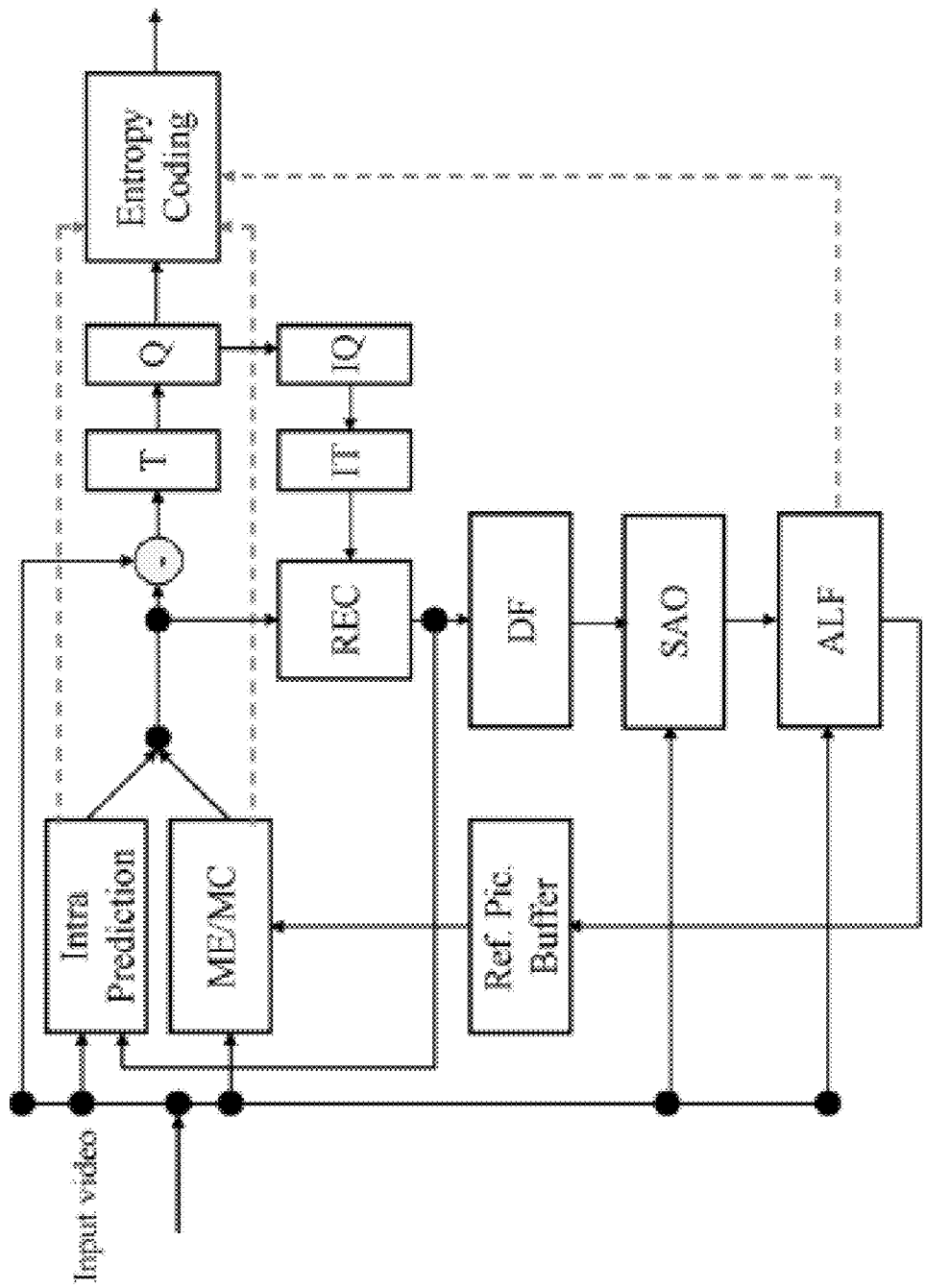
FIG. 1 shows an example of encoder block diagram.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.2.1. 4:4:4

Each of the three Y'CbCr components have the same sample rate, thus there is no chroma subsampling. This scheme is sometimes used in high-end film scanners and cinematic post production.

2.2.2. 4:2:2

The two chroma components are sampled at half the sample rate of luma: the horizontal chroma resolution is halved. This reduces the bandwidth of an uncompressed video signal by one-third with little to no visual difference

2.2.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In JPEG/JFIF, H.261, and MPEG-1, Cb and Cr are sited interstitially, halfway between alternate luma samples.
- In 4:2:0 DV, Cb and Cr are co-sited in the horizontal direction. In the vertical direction, they are co-sited on alternating lines.

2.3. Partitioning

2.3.1. Partitioning of the CTUs Using a Tree Structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 2:
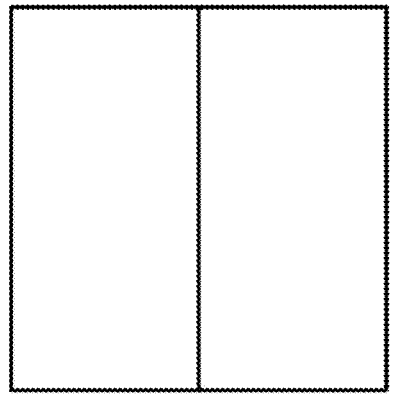
FIG. 2 shows an example of multi-type tree splitting modes.
Figure 2:
Figure 2:
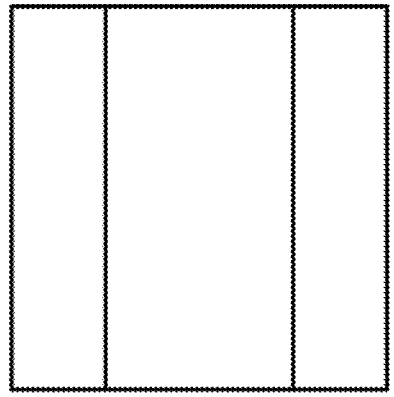
Figure 2:
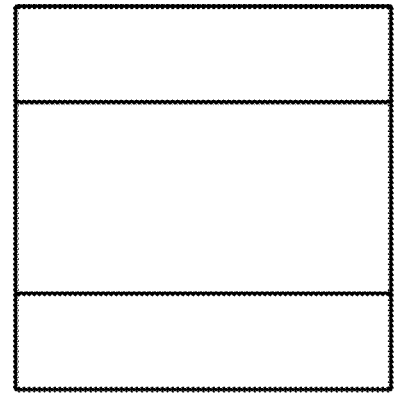

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 3:
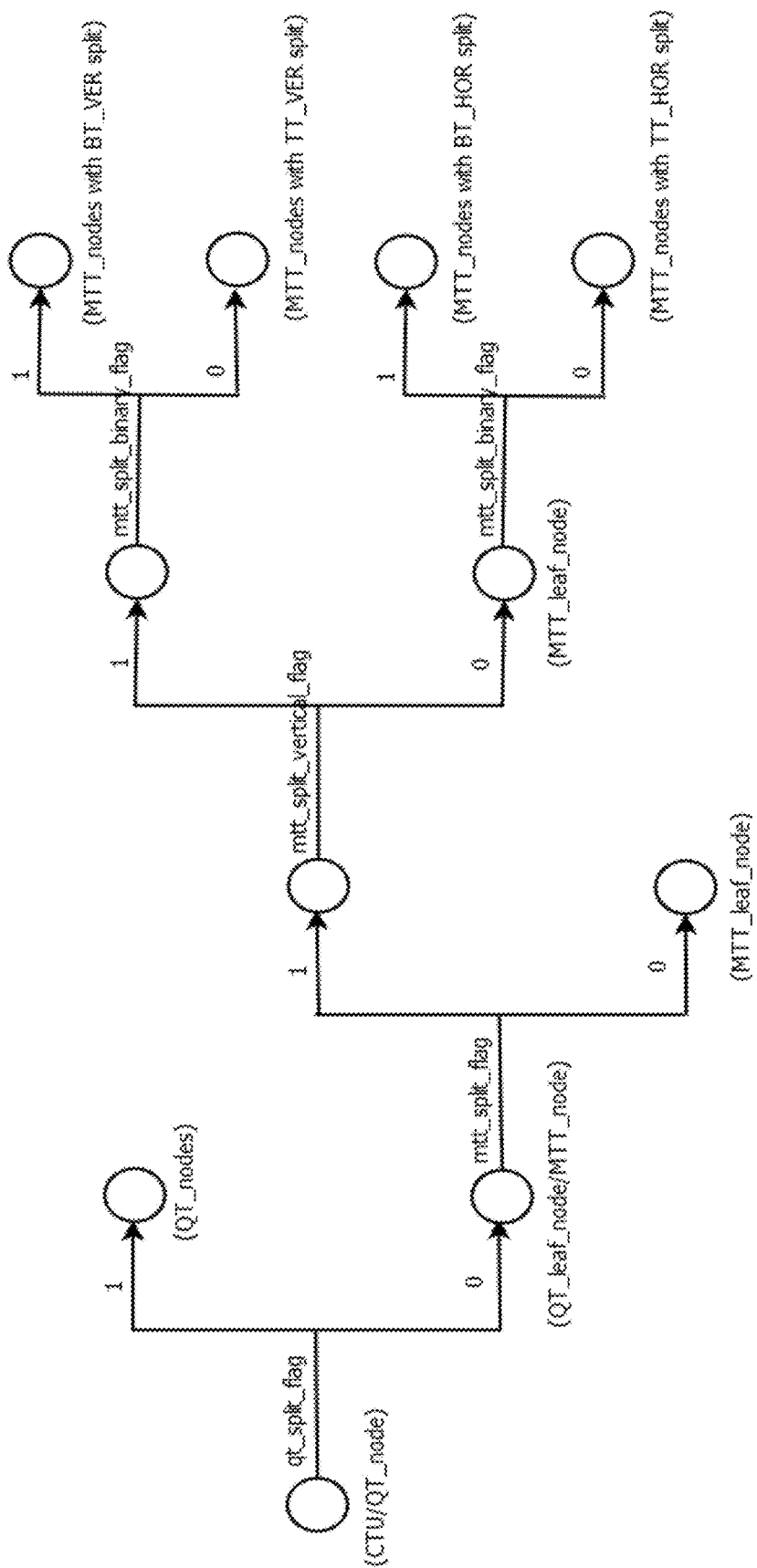
FIG. 3 shows an example of splitting flags signalling in quadtree with nested multi-type tree coding tree structure.

FIG. 3 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 2-1.

FIG. 3 shows an example of splitting flags signalling in quadtree with nested multi-type tree coding tree structure.

TABLE 2-1

| MttSplitMode derviation based on multi-type tree syntax elements | | |
|---|---|---|
| MttSplitMode | mtt_split_cu_vertical_flag | mtt_split_cu_binary_flag |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 4:
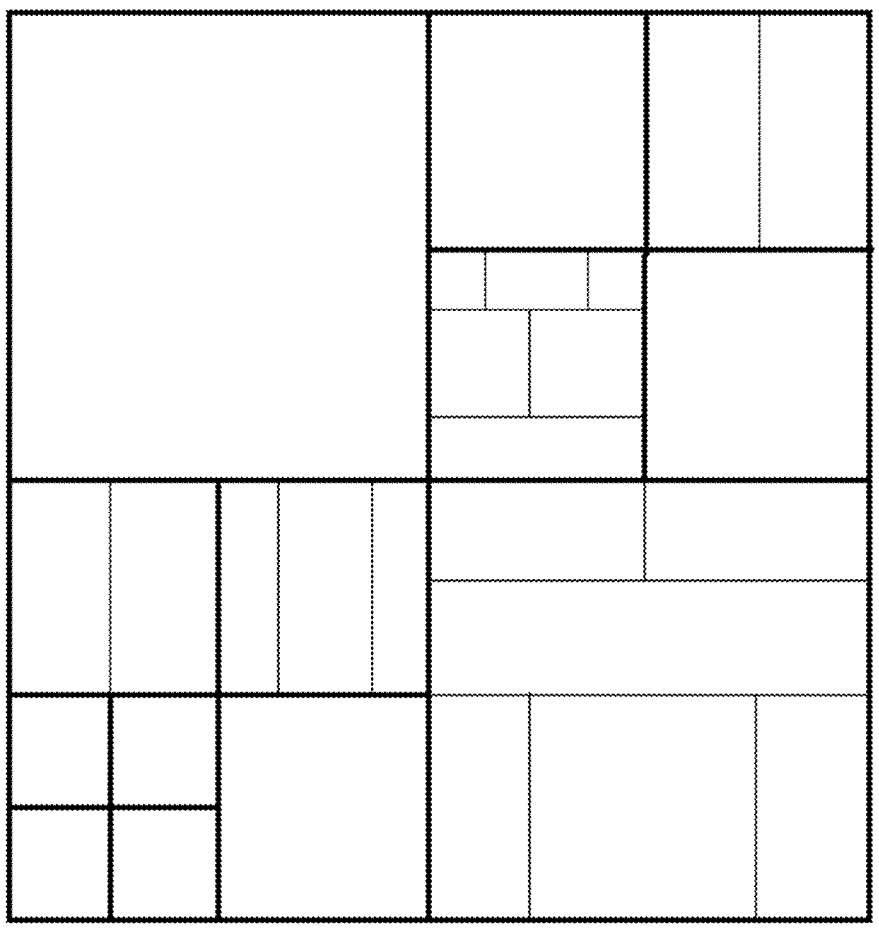
FIG. 4 shows an example of quadtree with nested multi-type tree coding block structure

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum chroma CB size is 2×2.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by SPS syntax elements for the quadtree with nested multi-type tree coding tree scheme.
 CTU size: the root node size of a quaternary tree
 MinQTSize: the minimum allowed quaternary tree leaf node size
 MaxBtSize: the maximum allowed binary tree root node size
 MaxTtSize: the maximum allowed ternary tree root node size
 MaxMttDepth: the maximum allowed hierarchy depth of multi-type tree splitting from a quadtree leaf MinBtSize: the minimum allowed binary tree leaf node size MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

Figure 5:
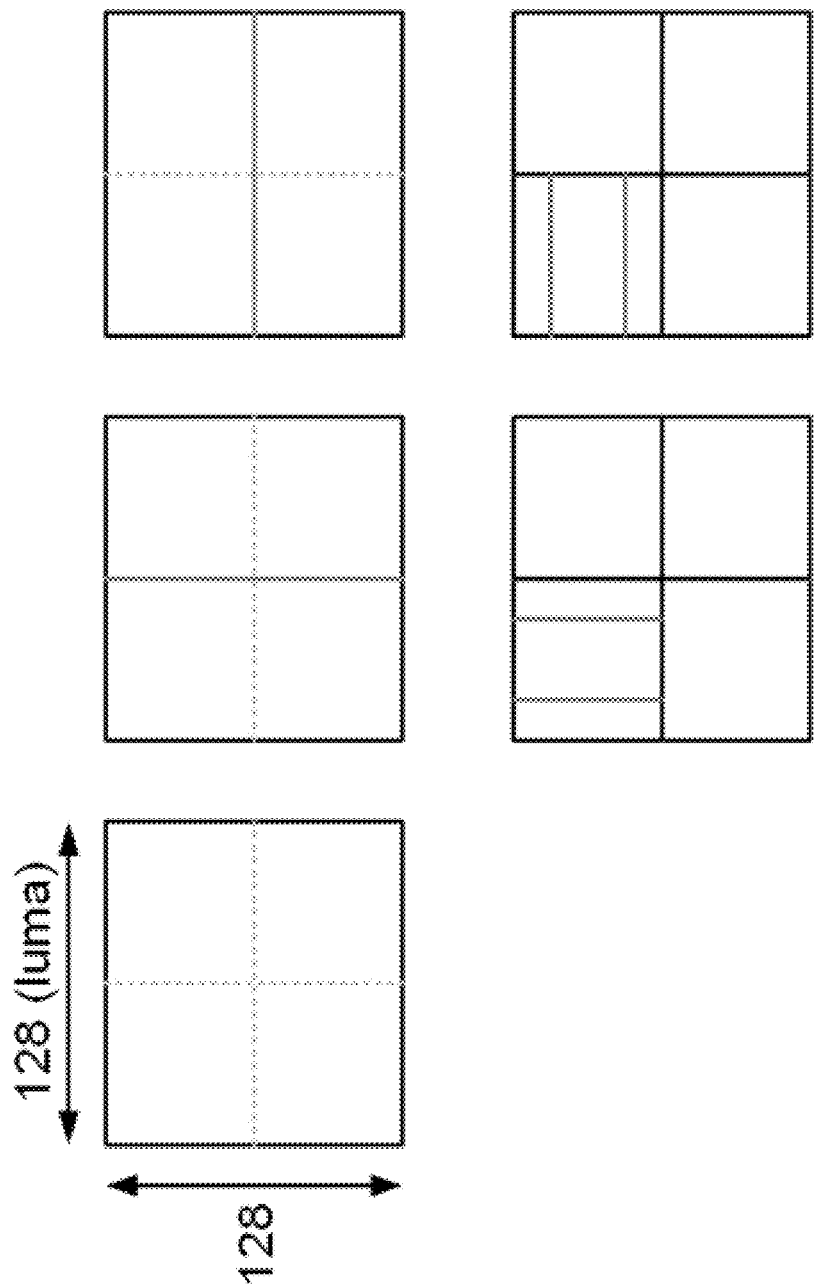
FIG. 5 shows an example of no TT split for 128×128 coding block.

To allow 64×64 Luma block and 32×32 Chroma pipelining design in VVC hardware decoders, TT split is forbidden when either width or height of a luma coding block is larger than 64, as shown in FIG. 5. TT split is also forbidden when either width or height of a chroma coding block is larger than 32.

In VTM6, the coding tree scheme supports the ability for the luma and chroma to have a separate block tree structure. Currently, for P and B slices, the luma and chroma CTBs in one CTU have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

2.3.2. Virtual Pipeline Data Units (VPDUs)

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

Figure 6:
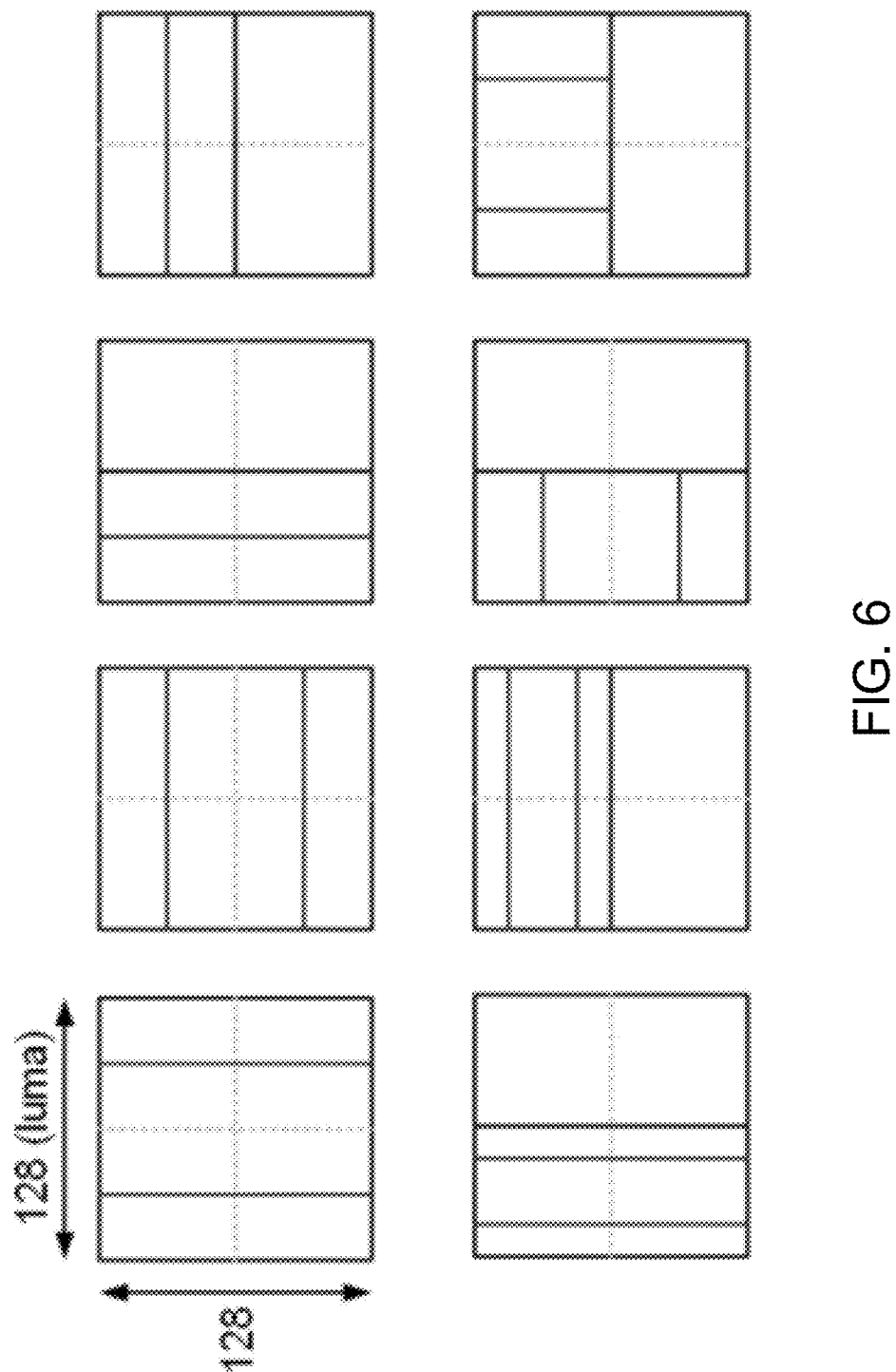
FIG. 6 shows examples of disallowed TT and BT partitioning in VTM6.

In order to keep the VPDU size as 64×64 luma samples, the following normative partition restrictions (with syntax signaling modification) are applied in VTM6, as shown in FIG. 6:

TT split is not allowed for a CU with either width or height, or both width and height equal to 128.

For a 128×N CU with N≤64 (i.e. width equal to 128 and height smaller than 128), horizontal BT is not allowed.

For an N×128 CU with N≤64 (i.e. height equal to 128 and width smaller than 128), vertical BT is not allowed.

The VPDU size is set to min (64, CTU size) wherein the CTU size is the width/height of the luma CTB.

2.4. Luma Mapping with Chroma Scaling (LMCS)

In VTM6, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied.

Figure 7:
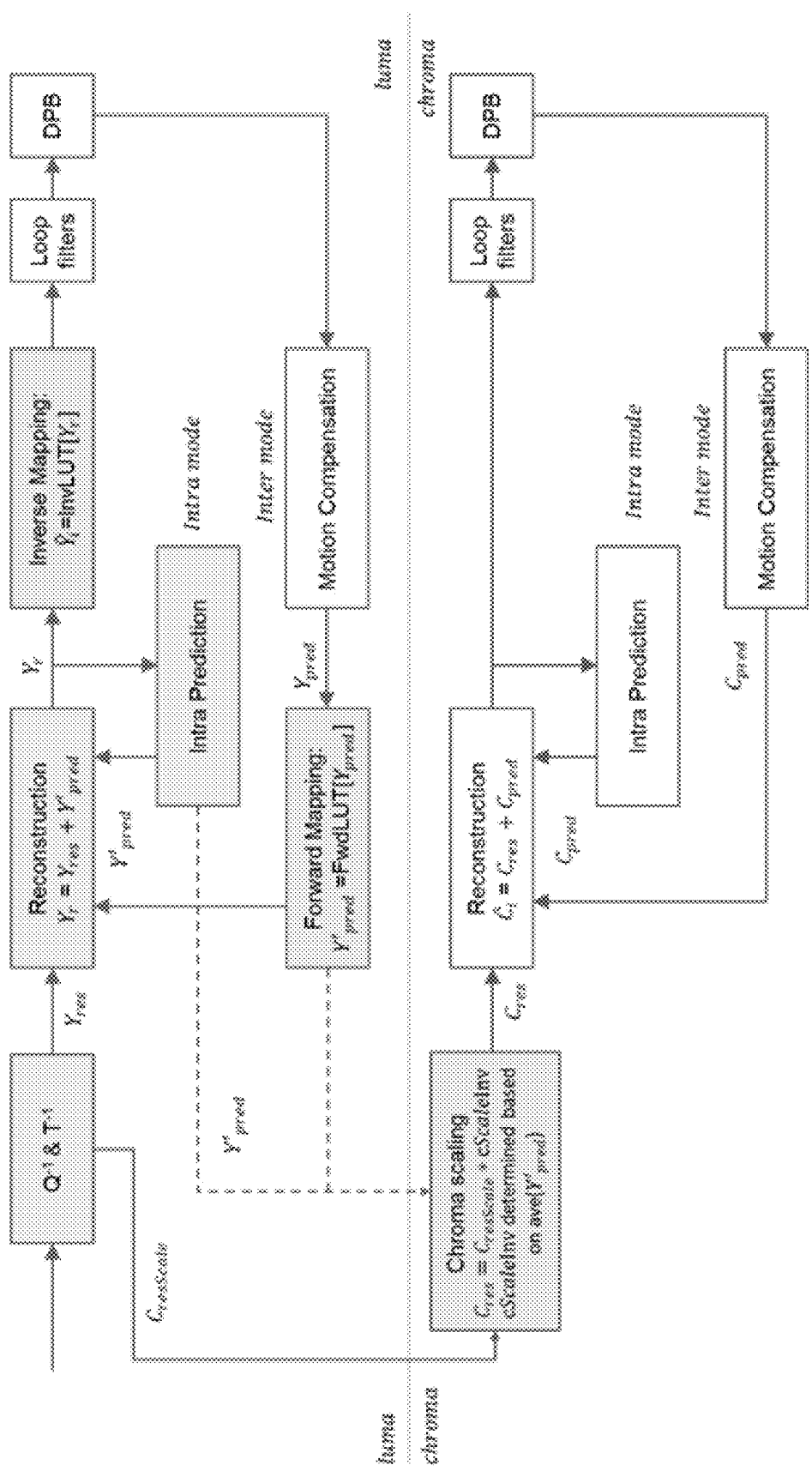
FIG. 7 shows an example of luma mapping with chroma scaling architecture.

FIG. 7 shows the LMCS architecture from decoder's perspective. The light-blue shaded blocks in FIG. 7 indicate where the processing is applied in the mapped domain; and these include the inverse quantization, inverse transform, luma intra prediction and adding of the luma prediction together with the luma residual. The unshaded blocks in FIG. 7 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The light-yellow shaded blocks in FIG. 7 are the new LMCS functional blocks, including forward and inverse mapping of the luma signal and a luma-dependent chroma scaling process. Like most other tools in VVC, LMCS can be enabled/disabled at the sequence level using an SPS flag.

2.4.1. Luma Mapping with Piecewise Linear Model

The in-loop mapping of the luma component adjusts the dynamic range of the input signal by redistributing the codewords across the dynamic range to improve compression efficiency. Luma mapping makes use of a forward mapping function, FwdMap, and a corresponding inverse mapping function, InvMap. The FwdMap function is signalled using a piecewise linear model with 16 equal pieces. InvMap function does not need to be signalled and is instead derived from the FwdMap function.

The luma mapping model is signalled at the slice level. A presence flag is signalled first. If luma mapping model is present in the current slice, corresponding piecewise linear model parameters are signalled. The piecewise linear model partitions the input signal's dynamic range into 16 equal pieces, and for each piece, its linear mapping parameters are expressed using the number of codewords assigned to that piece. Take 10-bit input as an example. Each of the 16 pieces will have 64 codewords assigned to it by default. The signalled number of codewords is used to calculate the scaling factor and adjust the mapping function accordingly for that piece. At the slice level, another LMCS enable flag is signalled to indicate if the LMCS process is applied to the current slice.

Each i-th piece, i=0 . . . 15, of the FwdMap piecewise linear model is defined by two input pivot points InputPivot[ ] and two output (mapped) pivot points MappedPivot[ ].

The InputPivot[ ] and MappedPivot[ ] are computed as follows (assuming 10-bit video):

1) OrgCW=64
2) For i=0:16, InputPivot[i]=i*OrgCW
3) For i=0:16, MappedPivot[i] is calculated as follows:

$$MappedPivot[0] = 0;$$

$$for(i = 0; i < 16, i++)$$

$$MappedPivot[i + 1] = MappedPivot[i] + SignalledCW[i]$$

where SignalledCW[i] is the signalled number of codewords for the i-th piece.

As shown in FIG. 7, for an inter-coded block, motion compensated prediction is performed in the mapped domain. In other words, after the motion-compensated prediction block $Y_{pred}$ is calculated based on the reference signals in the DPB, the FwdMap function is applied to map the luma prediction block in the original domain to the mapped domain, $Y'_{pred}$=FwdMap($Y_{pred}$). For an intra-coded block, the FwdMap function is not applied because intra prediction is performed in the mapped domain. After reconstructed block $Y_r$ is calculated, the InvMap function is applied to convert the reconstructed luma values in the mapped domain back to the reconstructed luma values in the original domain ($\hat{Y}_i$=InvMap($Y_r$)). The InvMap function is applied to both intra- and inter-coded luma blocks.

The luma mapping process (forward and/or inverse mapping) can be implemented using either look-up-tables (LUT) or using on-the-fly computation. If LUT is used, then FwdMapLUT and InvMapLUT can be pre-calculated and pre-stored for use at the slice level, and forward and inverse mapping can be simply implemented as FwdMap($Y_{pred}$)=FwdMapLUT[$Y_{pred}$] and InvMap($Y_r$)=InvMapLUT[$Y_r$], respectively. Alternatively, on-the-fly computation may be used. Take forward mapping function FwdMap as an example. In order to figure out the piece to which a luma sample belongs, the sample value is right shifted by 6 bits (which corresponds to 16 equal pieces). Then, the linear model parameters for that piece are retrieved and applied on-the-fly to compute the mapped luma value. Let i be the piece index, a1, a2 be InputPivot[i] and InputPivot[i+1], respectively, and b1, b2 be MappedPivot[i] and MappedPivot[i+1], respectively. The FwdMap function is evaluated as follows:

$$FwdMap(Y_{pred}) = ((b2 - b1)/(a2 - a1)) * (Y_{pred} - a1) + b1$$

The InvMap function can be computed on-the-fly in a similar manner, except that conditional checks need to be applied instead of a simple right bit-shift when figuring out the piece to which the sample value belongs, because the pieces in the mapped domain are not equal sized.

2.4.2. Luma-Dependent Chroma Residual Scaling

Chroma residual scaling is designed to compensate for the interaction between the luma signal and its corresponding chroma signals. Whether chroma residual scaling is enabled or not is also signalled at the slice level. If luma mapping is enabled and if dual tree partition (also known as separate chroma tree) is not applied to the current slice, an additional flag is signalled to indicate if luma-dependent chroma residual scaling is enabled or not. When luma mapping is not used, or when dual tree partition is used in the current slice, luma-dependent chroma residual scaling is disabled. Further, luma-dependent chroma residual scaling is always disabled for the chroma blocks whose area is less than or equal to 4.

Chroma residual scaling depends on the average value of the corresponding luma prediction block (for both intra- and inter-coded blocks). Denote avgY' as the average of the luma prediction block. The value of $C_{ScaleInv}$ is computed in the following steps:

1) Find the index $Y_{Idx}$ of the piecewise linear model to which avgY' belongs based on the InvMap function.
2) $C_{ScaleInv}$=cScaleInv[$Y_{Idx}$], where cScaleInv[ ] is a pre-computed 16-piece LUT.

If the current block is coded as intra, CIIP, or intra block copy (IBC, a.k.a. current picture referencing or CPR) modes, avgY' is computed as the average of the intra-, CIIP-, or IBC-predicted luma values; otherwise, avgY' is computed as the average of the forward mapped inter predicted luma values ($Y'_{pred}$ in 2.4.1). Unlike luma mapping, which is performed on the sample basis, $C_{ScaleInv}$ is a constant value for the entire chroma block. With $C_{ScaleInv}$, chroma residual scaling is applied as follows:

$$\text{Encoder side: } C_{ResScale} = C_{Res} * C_{Scale} = C_{Res}/C_{ScaleInv}$$

$$\text{Decoder side: } C_{Res} = C_{ResScale}/C_{Scale} = C_{ResScale} * C_{ScaleInv}$$

2.5. Joint Coding of Chroma Residuals (JCCR)

VVC Draft 6 supports a mode where the chroma residuals are coded jointly. The usage (activation) of a joint chroma coding mode is indicated by a TU-level flag tu_joint_cbcr_residual_flag and the selected mode is implicitly indicated by the chroma CBFs. The flag tu_joint_cbcr_residual_flag is present if either or both chroma CBFs for a TU are equal to 1. In the PPS and slice header, chroma QP offset values are signalled for the joint chroma residual coding mode to differentiate from the usual chroma QP offset values signalled for regular chroma residual coding mode. These chroma QP offset values are used to derive the chroma QP values for those blocks coded using the joint chroma residual coding mode. When a corresponding joint chroma coding mode (modes 2 in Table 3) is active in a TU, this chroma QP offset is added to the applied luma-derived chroma QP during quantization and decoding of that TU. For the other modes (modes 1 and 3 in Table 3 Table 2-2: Reconstruction of chroma residuals. The value CSign is a sign value (+1 or −1), which is specified in the slice header, resJointC[ ][ ] is the transmitted residual.), the chroma QPs are derived in the same way as for conventional Cb or Cr blocks. The reconstruction process of the chroma residuals (resCb and resCr) from the transmitted transform blocks is depicted in Table 3. When this mode is activated, one single joint chroma residual block (resJointC[x][y] in Table 3) is signalled, and residual block for Cb (resCb) and residual block for Cr (resCr) are derived considering information such as tu_cbf_cb, tu_cbf_cr, and CSign, which is a sign value specified in the slice header.

At the encoder side, the joint chroma components are derived as explained in the following. Depending on the mode (listed in the tables above), resJointC are generated by the encoder as follows:

If mode is equal to 2 (single residual with reconstruction Cb=C, Cr=CSign*C), the joint residual is determined according to $$resJointC[x][y] = (resCb[x][y] + CSign*resCr[x][y])/2.$$

Otherwise, if mode is equal to 1 (single residual with reconstruction Cb=C, Cr=(CSign*C)/2), the joint residual is determined according to $$resJointC[x][y] = (4*resCb[x][y] + 2*CSign*resCr[x][y])/5.$$

Otherwise (mode is equal to 3, i. e., single residual, reconstruction Cr=C, Cb=(CSign*C)/2), the joint residual is determined according to $$resJointC[x][y] = (4*resCr[x][y] + 2*CSign*resCb[x][y])/5.$$

Otherwise, the variable TuCResMode[x0][y0] is set equal to 3.

8.7.2 Scaling and Transformation Process

4. The residual samples resSamples[x][y] with x=0 ... nTbW−1, y=0 ... nTbH−1 are derived as follows:

If cIdx is equal to codedCIdx, the following applies:

$$resSamples[x][y] = res[x][y] \qquad (8\text{-}947)$$

Otherwise, if TuCResMode[xTbY][yTbY] is equal to 2, the following applies:

$$resSamples[x][y] = cSign*res[x][y] \qquad (8\text{-}948)$$

TABLE 2-2

Reconstruction of chroma residuals. The value CSign is a sign value (+1 or −1), which is specified in the slice header, resJointC[ ][ ] is the transmitted residual.

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ] ) >> 1<br>resCr[ x ][ y ] = resJointC[ x ][ y ] | 3 |

Corresponding specification for this decoding process is as follows:

tu_joint_cbcr_residual_flag[x0][y0] specifies whether the residual samples for both chroma components Cb and Cr are coded as a single transform block. The array indices x0, y0 specify the location (x0, y0) of the top-left luma sample of the considered transform block relative to the top-left luma sample of the picture.

tu_joint_cbcr_residual_flag[x0][y0] equal to 1 specifies that the transform unit syntax includes the transform coefficient levels for a single transform block from which the residual samples for both Cb and Cr are derived. tu_joint_cbcr_residual_flag[x0][y0] equal to 0 specifies that the transform coefficient levels of the chroma components are coded as indicated by the syntax elements tu_cbf_cb[x0][y0] and tu_cbf_cr[x0][y0].

When tu_joint_cbcr_residual_flag[x0][y0] is not present, it is inferred to be equal to 0.

Depending on tu_joint_cbcr_residual_flag[x0][y0], tu_cbf_cb[x0][y0], and tu_cbf_cr[x0][y0], the variable TuCResMode[x0][y0] is derived as follows:

- If tu_joint_cbcr_residual_flag[x0][y0] is equal to 0, the variable TuCResMode[x0][y0] is set equal to 0;
- Otherwise, if tu_cbf_cb[x0][y0] is equal to 1 and tu_cbf_cr[x0][y0] is equal to 0, the variable TuCResMode[x0][y0] is set equal to 1;
- Otherwise, if tu_cbf_cb[x0][y0] is equal to 1, the variable TuCResMode[x0][y0] is set equal to 2;

Otherwise, the following applies:

$$resSamples[x][y] = (cSign*res[x][y]) \gg 1 \qquad (8\text{-}949)$$

2.6. Transforms

Two-level transforms may be applied to one transform block, including primary transform and secondary transform.

For the primary transform, the DCT-II is utilized. In addition, when the MTS is enabled for a SPS, other kinds of transform matrices may be applied depending on coded information/signaled information. Transform skip mode could be treated as a special case of only applying the primary transform wherein the transform matric is the identity transform.

For the secondary transform, the non-separable transform matrices are employed.

Details of transform related parts are described as follows.

2.6.1. Multiple Transform Set (MTS) in VVC

2.6.1.1. Explicit Multiple Transform Set (MTS)

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. The Table 2-3 below shows the basis functions of the selected DST/DCT.

TABLE 2-3

Basis functions of transform matrices used in VVC.

| Transform Type | Basis function $T_i(j)$, i, j = 0, 1, . . . , N − 1 |
| --- | --- |
| DCT-II | $T_i(j) = \omega_0 \cdot \sqrt{\frac{2}{N}} \cdot \cos\left(\frac{\pi \cdot i \cdot (2j+1)}{2N}\right)$ <br><br> where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 2-4. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 2-4

Mapping of decoded value of tu_mts_idx and corresponding transform matrices for the horizontal and vertical directions.

| Bin string of tu_mts_idx | tu_mts_idx | Intra/inter | |
| --- | --- | --- | --- |
| | | Horizontal | Vertical |
| 0 | 0 | DCT2 | |
| 1 0 | 1 | DST7 | DST7 |
| 1 1 0 | 2 | DCT8 | DST7 |
| 1 1 1 0 | 3 | DST7 | DCT8 |
| 1 1 1 1 | 4 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case of MTS.

2.6.2. LFNST (a.k.a RST/NSST)

Figure 8:
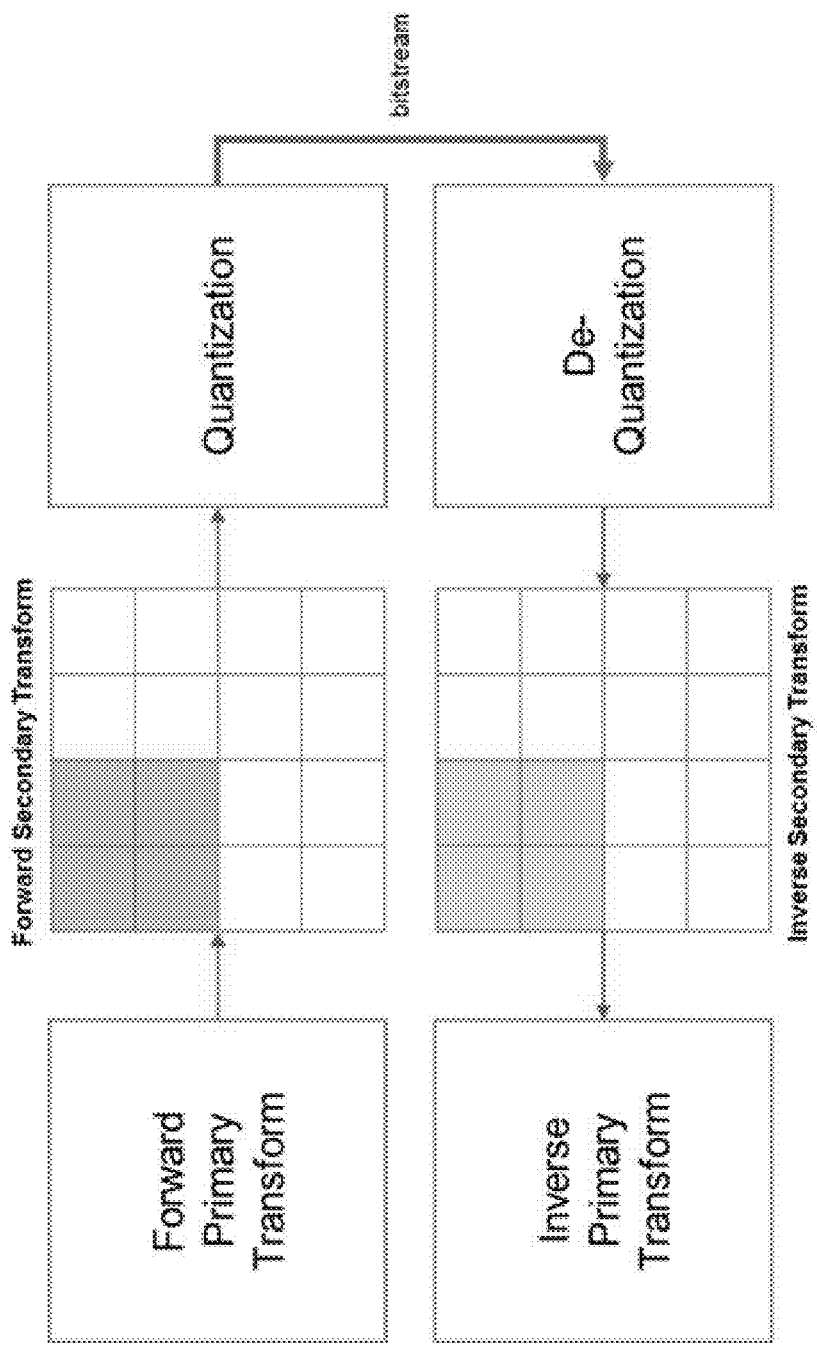
FIG. 8 shows an example of secondary transform in JEM.

In JEM, secondary transform is applied between forward primary transform and quantization (at encoder) and between de-quantization and inverse primary transform (at decoder side). As shown in FIG. 8, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

For the secondary transforms, non-separable transforms are applied, therefore, it is also named as Non-Separable Secondary Transform (NSST). There are totally 35 transform sets and 3 non-separable transform matrices (kernels, each one with 16×16 matrix) per transform set are used.

The Reduced Secondary Transform (RST, also known as low frequence non-separable transform, LFNST) was introduced in JVET-K0099 and 4 transform sets (instead of 35 transform sets) mapping introduced in JVET-L0133 according to intra prediction direction. In this contribution, 16×48 and 16×16 matrices are employed for 8×8 and 4×4 blocks, respectively. For notational convenience, 16×48 transform is denoted as RST 8×8 and the 16×16 one as RST 4×4. Such a method was recently adopted by VVC.

Figure 9:
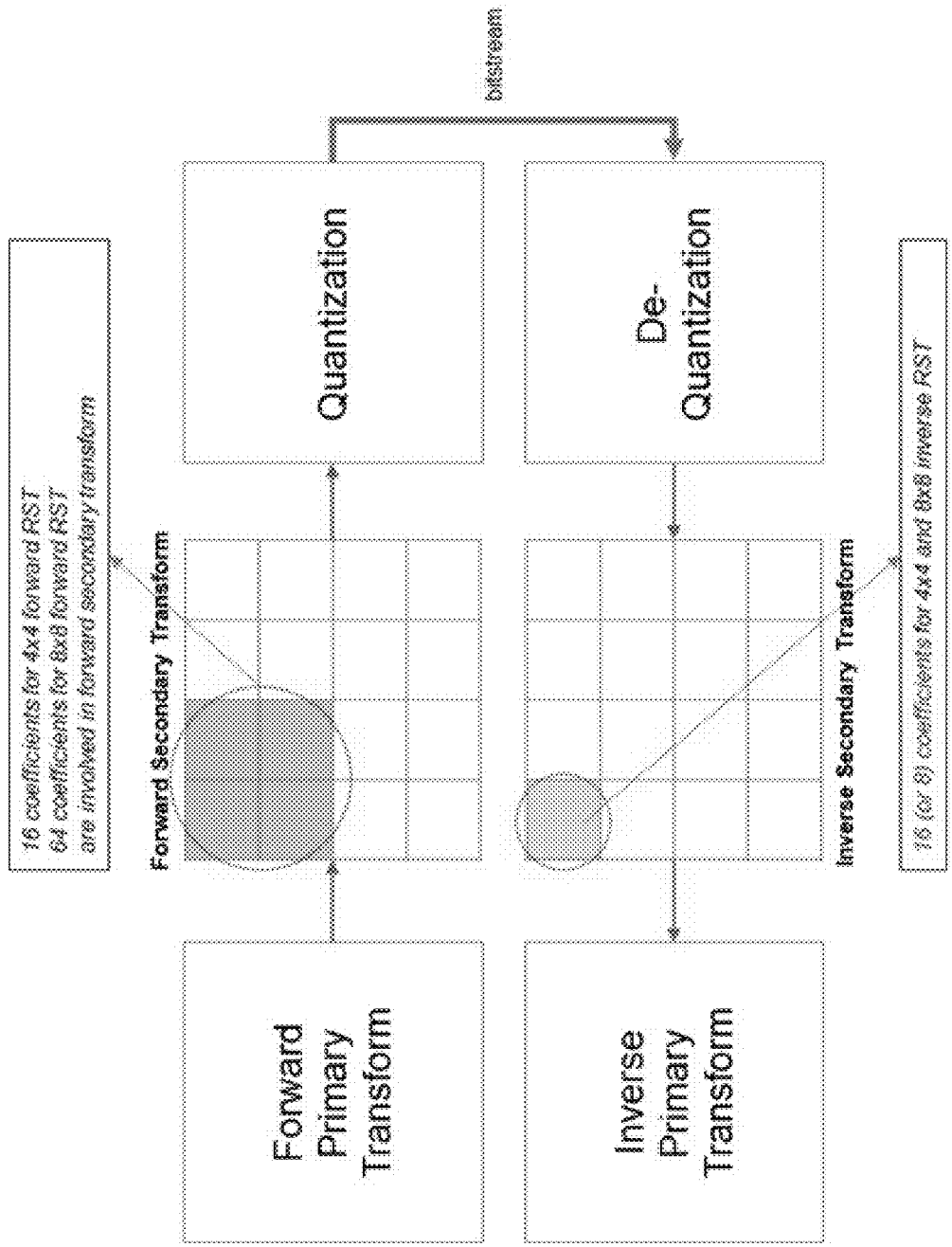
FIG. 9 shows an example of proposed Reduced Secondary Transform (RST).

FIG. 9 shows proposed Reduced Secondary Transform (RST)

Secondary forward and inverse transforms are a separate process step from that of primary transforms For encoder, the primary forward transform is performed first, then followed by secondary forward transform and quantization, and CABAC bit encoding. For decoder, CABAC bit decoding and inverse quantization, then Secondary inverse transform is performed first, then followed by primary inverse transform. RST applies only to intra coded TUs.

2.7. Interactions Among Coding Tools

Figure 10:
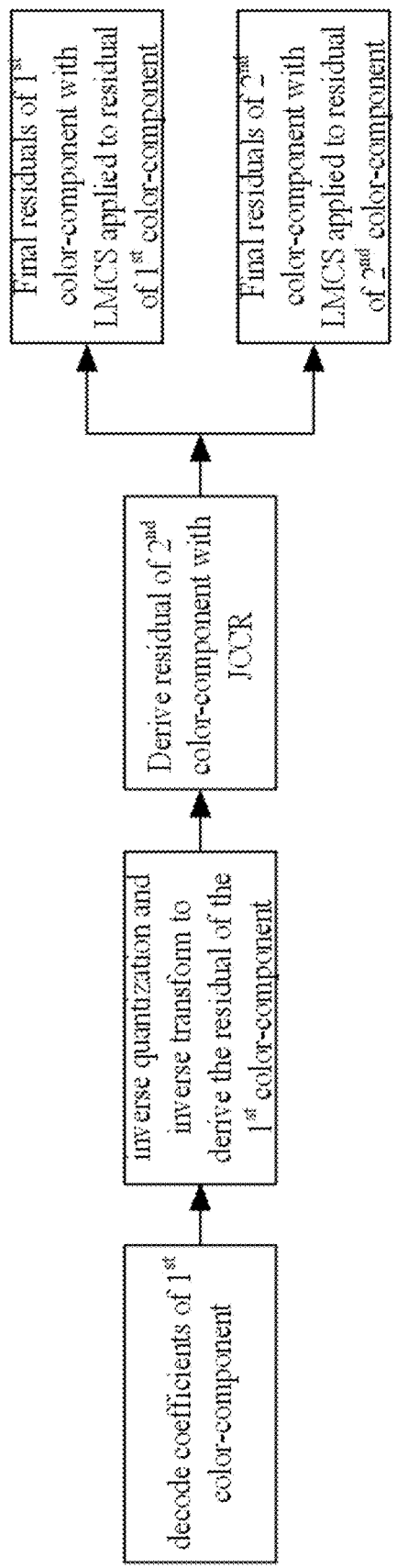
FIG. 10 shows a decoding flow for video processing.

In current VVC, the decoding order is depicted in FIG. 10.

3. Technical Problems Addressed by Technical Solutions Described Herein

The current design has the following problems:
1. The current decoding order has two drawbacks:
   a. For one thing, the chroma residual scaling process is applied to each of the two chroma blocks even it is JCCR coded which is a waste of computational complexity.
   b. For another thing, if higher precision for intermediate values is the intention, the JCCR should be directly applied to the decoded coefficients instead of the residual after inverse quantization/transform.
2. The rounding of residuals in JCCR mode 1 and 3 is sub-optimal since it doesn't consider the sign information of a residual.
3. The partition generated from BT or TT may violate the VPDU restrictions when the maximum transform size in luma samples is equal to 32.
4. The BT and TT partition can be optimized.
5. LMCS may not work correctly when the maximum transform size in luma samples is equal to 32.
6. The dependency between luma and chrome reconstruction processes increases the latency of both encoder and decoder.

4. Examples of Techniques and Embodiments

The detailed inventions below should be considered as examples to explain general concepts. These inventions should not be interpreted in a narrow way. Furthermore, these inventions can be combined in any manner.

In the following discussion, a CU may comprise information associated to all the three-color components with the single tree coding structure. Or a CU may comprise information only associated to the luma color component with the mono-color coding. Or a CU may comprise information only associated to the luma color component (e.g., Y component in YCbCr format or G component in GBR format) with the dual tree coding structure. Or a CU may comprise information only associated to the two chroma components (e.g., Cb and Cr components in YCbCr format or B and R components in GBR format) with the dual-tree coding structure.

In the following description, a "block" may refer to coding unit (CU) or a transform unit (TU) or any rectangle region of video data. a "current block" may refer to a current being decoded/coded coding unit (CU) or a current being decoded/coded transform unit (TU) or any being decoded/coded coding rectangle region of video data. "CU" or "TU" may be also known as "coding block" and "transform block".

In the following description, a "current block" may refer to a current being decoded/coded coding unit (CU) or a current being decoded/coded transform unit (TU).

In the following description, coding information may include prediction mode (e.g., intra/inter/IBC mode), motion vector, reference picture, inter prediction direction, intra prediction mode, CIIP (combined intra inter prediction) mode, ISP mode, affine intra mode, employed transform core, transform skip flag etc., i.e., information required when encoding a block.

Shift(x, s) is defined as:
Shift(x,s)=(x+off)>>s wherein the variable off is an integer unequal to 0, e.g., set to 1<<(s−1).

Figure 11:
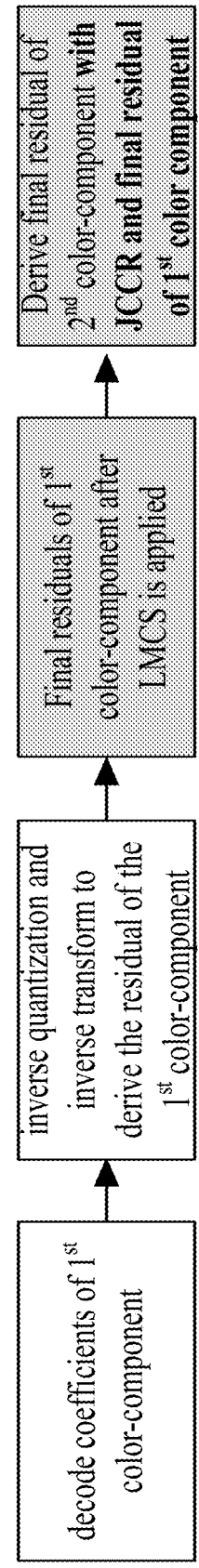
FIG. 11 shows an example of a decoding flow with LMCS applied once for two chroma blocks (JCCR applied to final residual of 1st color component block).

SignShift(x, s) is defined as:

$$SignShift(x, s) = \begin{cases} (x+\text{off}) \gg s & x \geq 0 \\ -((-x+\text{off}) \gg s) & x < 0 \end{cases},$$

wherein the variable off is an integer such as 0 or 1<<(s−1).
1. The decoding process is modified to be invoked in the following orders:
   a. In one example, chroma residual scaling process in the LMCS is only applied to one of two chroma blocks corresponding to the two chroma color components in the same transform unit.
      i. In one example, chroma residual scaling process is applied to a $1^{st}$ color component to derive the scaled chroma residual of the $1^{st}$ color component (e.g., final residual of the $1^{st}$ color component). And the scaled chroma residual of the $1^{st}$ color component (e.g., with LMCS applied to the chroma block) may be utilized to derive the scaled chroma residual of a $2^{nd}$ color component (e.g., final residual of the $1^{st}$ color component).
         1) Alternatively, furthermore, how to derive the scaled chroma residual of the $2^{nd}$ color component may depend on the decoded information, e.g., the side information related to JCCR.
         2) In one example, JCCR is applied to the scaled chroma residual of a $1^{st}$ color component wherein the input (i.e., resJointC) to Table 2-2 is the scaled chroma residual of the $1^{st}$ color component.
      ii. Alternatively, furthermore, inverse quantization and inverse transform is firstly applied to a $1^{st}$ color component, if needed; then the chroma residual scaling is applied to the $1^{st}$ color component to derive the final residuals of the 1st color component, if needed; at last, JCCR is applied to the final residuals of the 1st color component to derive the residual for a $2^{nd}$ color component.
         1) Alternatively, furthermore, after above processes, clipping may be further applied to the residual of the 2nd color component.
            a. In one example, the residuals may be clipped to a range which may depend on the bit-depth of the 2nd color component/chroma components.
               i. In one example, the range may be defined as:

$$[-(1 \ll BitDepth_C), (1 \ll BitDepth_C) - 1].$$

iii. An example of decoding flow is depicted in FIG. 11. It is noted that for certain process (e.g., inverse transform), it may be skipped according to decoded information.
   b. In one example, chroma residual scaling process in the LMCS is split to two steps: $1^{st}$ step is to calculate multiplication between an input value (denoted by A) or absolute input value (denoted by abs(A)) and scaling factor (denoted by S); and $2^{nd}$ step is to calculate the shifting (e.g., Shift(A, S) or SignShift(A, S)).
      i. It is proposed that the first step is applied only to one of the two chroma blocks corresponding to the two chroma color components in the same transform unit.

Figure 12:
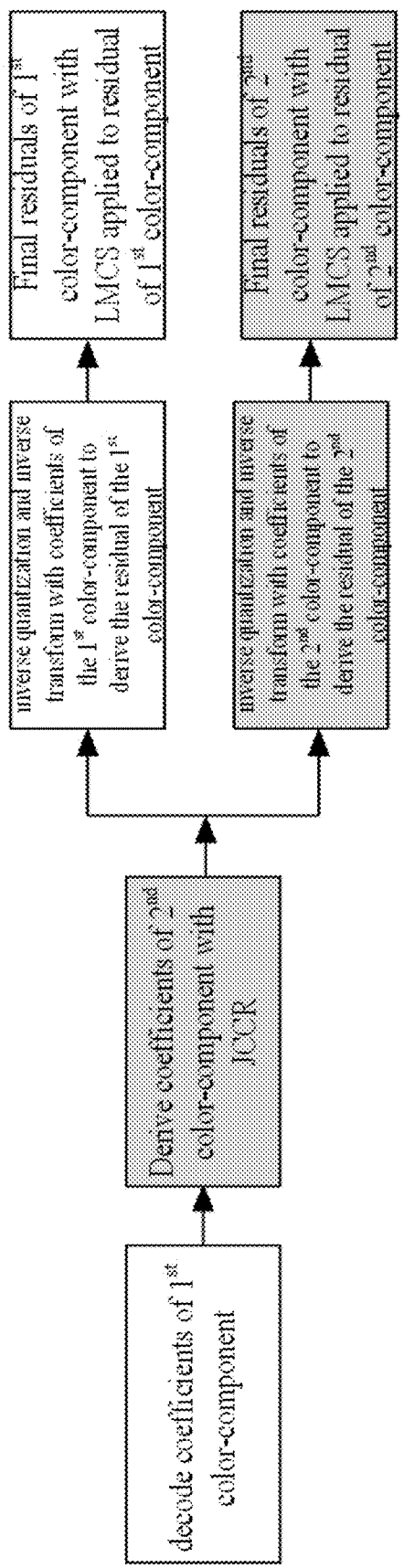
FIG. 12 shows an example of decoding flow with JCCR applied to coefficients of 1st color component.

1) Alternatively, furthermore, for the $1^{st}$ color component, after inverse quantization, inverse transform processes, if needed, the first step is then applied to generate temporary chroma residual block of the $1^{st}$ color component.
    a. Alternatively, furthermore, the temporary chroma residual block of the $1^{st}$ color component may be utilized to generate the final residual block of the $1^{st}$ color component, e.g., via invoking the second step in chroma residual scaling process, such as Shift(A, S) or SignShift (A, S).
    b. Alternatively, furthermore, the temporary chroma residual block of the $1^{st}$ color component may be utilized to generate the final residual block of a $2^{nd}$ color component. For example, according to the JCCR side information, using cSign*Shift(A, S+1) or cSign*SignShift(A, S+1) if JCCR mode is unequal to 2 wherein cSign is the indication of whether invert sign is applied to JCCR coded blocks.
  c. In one example, decoded coefficients of the $1^{st}$ color component (e.g., those parsed from the bitstream) may be utilized to derive the coefficients of the $2^{nd}$ color component.
    i. Alternatively, furthermore, how to derive the coefficients of the $2^{nd}$ color component may depend on the decoded information, e.g., the side information related to JCCR.
      1) In one example, JCCR is applied to the scaled chroma residual of the $1^{st}$ color component wherein the input (i.e., resJointC) to Table 2-2 is the decoded coefficients of the $1^{st}$ color component.
    ii. In one example, JCCR may be firstly applied to the decoded coefficients associated with a $1^{st}$ color component to derive the coefficients of a $2^{nd}$ color component.
      1) Alternatively, furthermore, after JCCR, the inverse quantization and inverse transform may be applied to the two-color components, respectively, if needed; at last, the chroma residual scaling are applied to each of the two-color components.
    iii. An example of decoding flow is depicted in FIG. 12. It is noted that for certain process (e.g., inverse transform), it may be skipped according to decoded information.
  d. In one example, the '$1^{st}$ color component' may be defined as the Cb (or B) color component if the coded block flag (CBF) of the Cb color component (e.g., tu_cbf_cb) is equal to 1 or both CBFs of two-color components (e.g., tu_cbf_cb and tu_cbf_cr) are true.
    i. Alternatively, the '$2^{nd}$ color component' may be defined as Cr (or R) color component.
  e. In one example, the '$1^{st}$ color component' may be defined as the Cr (or R) color component if the coded block flag (CBF) of the Cr color component (e.g., tu_cbf_cr) is equal to 1.
    i. Alternatively, the '$2^{nd}$ color component' may be defined as Cb (or B) color component.
2. The residual/coefficient scaling process in JCCR (e.g., for mode 1 and/or 3) is modified from (x>>s) to Shift(x, s) wherein the variable x is the value of $1^{st}$ color component and the output of the function is the corresponding derived value of $2^{nd}$ color component.
    a. Alternatively, the process is modified to be SignShift(x, s).
3. JCCR may be applied to certain coded modes instead of being applied all blocks with non-zero coefficients.
    a. In one example, it may be applied to chroma blocks coded with cross-component linear prediction method which utilizes decoded information from a different color-component.
    b. In one example, it may be applied to chroma blocks coded with the direct mode which derives the intra prediction modes of the chroma block from luma blocks.
    c. Alternatively, furthermore, the signaling of JCCR side information (e.g., whether JCCR is applied or not for a block, denoted by tu_joint_cbcr_residual_flag) is further skipped.
4. JCCR may be applied to certain block dimensions without being signaled. Denote the block dimension by W*H wherein W and H are the width and height in chroma samples.
    d. In one example, when W<=T1 and/or H<=T2, JCCR may be directly applied.
    e. In one example, when W<T1 and/or H<T2, JCCR may be directly applied.
    f. In one example, when W*H<=T3, JCCR may be directly applied.
    g. In one example, when W>=T1 and/or H>=T2, JCCR may be directly applied.
    h. In one example, when W>T1 and/or H>T2, JCCR may be directly applied.
    i. In one example, when W*H<=T3, JCCR may be directly applied.
    j. In above examples, T1 and/or T2 and/or T3 are integers which may be pre-defined or signaled or derived on-the-fly (e.g., according to picture/slice quantization parameters).
      i. In above examples, T1 and/or T2 and/or T3 may be set to 4, 8, 32, 16, 128.
    k. Alternatively, furthermore, W and H may represent the width and height in luma samples in a luma block corresponding to current chroma block.
5. Whether SPLIT_BT_VER is allowed (allowSplitBtVer) may depend on the size of the current block, the VPDU size (VpduSize), and the maximum transform block size (MaxTbSize).
    l. In one example, allowSplitBtVer may be set equal to FALSE when the block width is less than or equal to VpduSize and the block height is greater than Vpdu-Size.
      i. In one example, VpduSize is set to 64.
    m. In one example, allowSplitBtVer may be set equal to FALSE when the block width is less than or equal to Max(VpduSize, MaxTbSize) and the block height is greater than Max(VpduSize, MaxTbSize).
      i. In one example, VpduSize is set to 64 and MaxTbSize is set to 64.
      ii. In one example, VpduSize is set to 64 and MaxTbSize is set to 32.
6. Whether SPLIT_BT_HOR is allowed (allowSplitBtHor) may depend on the size of the current block, the VPDU size (VpduSize), and the maximum transform block size (MaxTbSize).
    n. In one example, allowSplitBtHor may be set equal to FALSE when the block height is less than or equal to VpduSize and the block width is greater than Vpdu-Size.
      i. In one example, VpduSize is set to 64.

o. In one example, allowSplitBtHor may be set equal to FALSE when the block height is less than or equal to Max(VpduSize, MaxTbSize) and the block width is greater than Max(VpduSize, MaxTbSize).
  i. In one example, VpduSize is set to 64 and MaxTbSize is set to 64.
  ii. In one example, VpduSize is set to 64 and MaxTbSize is set to 32.

7. Whether SPLIT_TT_VER is allowed (allowSplitTtVer) may depend on the size of the current block, the VPDU size (VpduSize), maximum transform block size (MaxTbSize), and the maximum ternary tree size (maxTtSize).
  p. In one example, allowSplitTtVer may be set equal to FALSE when the block width or the block height is greater than Min(VpduSize, maxTtSize).
    i. In one example, VpduSize is set to 64.
  q. In one example, allowSplitTtVer may be set equal to FALSE when the block width or the block height is greater than Min(Max(VpduSize, MaxTbSize), maxTtSize).
    i. In one example, VpduSize is set to 64 and MaxTbSize is set to 64.
    ii. In one example, VpduSize is set to 64 and MaxTbSize is set to 32.

8. Whether SPLIT_TT_HOR is allowed (allowSplitTtHor) may depend on the size of the current block, the VPDU size (VpduSize), the maximum transform block size (MaxTbSize), and the maximum ternary tree size (maxTtSize).
  r. In one example, allowSplitTtHor may be set equal to FALSE when the block width or the block height is greater than Min(VpduSize, maxTtSize).
    i. In one example, VpduSize is set to 64.
  s. In one example, allowSplitTtHor may be set equal to FALSE when the block width or the block height is greater than Min(Max(VpduSize, MaxTbSize), maxTtSize).
    i. In one example, VpduSize is set to 64 and MaxTbSize is set to 64.
    ii. In one example, VpduSize is set to 64 and MaxTbSize is set to 32.

9. When deriving the chroma scaling factors from luma blocks in the LMCS process, it is disallowed to fetch information from a luma coding unit (CU). The luma CU is the corresponding 10. When deriving the chroma scaling factors from luma blocks in the LMCS process, it is disallowed to fetch information from a luma coding unit (CU). The luma CU is the corresponding luma CU that covers the corresponding luma sample of a representative chroma sample in current chroma block.
  a. Alternatively, the luma CU is the corresponding luma CU that covers the corresponding luma sample of any chroma sample in current chroma block.

11. It is proposed to use the same scaling factors for all chroma samples within one chroma CU regardless whether the chroma CU is split to multiple TUs or not.
  a. Alternatively, furthermore, the same luma reconstructed samples may be accessed to derive the scaling factors for all chroma samples within one chroma CU regardless whether the chroma CU is split to multiple TUs or not.
  b. Alternatively, furthermore, the same luma reconstructed samples may be accessed to derive the scaling factors for all chroma samples and these luma reconstructed samples are those outside the corresponding luma CU of current chroma CU.
  c. Alternatively, when one chroma CU is split to multiple TUs, chroma residual scaling may be applied to only partial of TUs, e.g., the TUs at the top boundary of the CU.
  d. Alternatively, when one chroma CU is split to multiple TUs, chroma residual scaling may be disabled.
  e. In one example, the above methods may be invoked when current CU size is greater than the maximum TB sizes.

12. Indications of whether to enable the proposed methods and/or which bullets to be applied may be signaled in a video unit level.
  a. In one example, the video unit may be tile/brick/slice/picture/sub-picture/sequence/view, etc. al.
  b. In one example, whether to enable the proposed methods and/or how to enable the proposed methods may be signaled in sequence parameter set/view parameter set/Adaptation parameter set/picture parameter set/picture header/slice header.
  c. Alternatively, whether to enable the proposed methods and/or how to enable the proposed methods may be controlled by other syntax elements.
    i. In one example, it may be controlled by whether JCCR is enabled (e.g., sps_joint_cbcr_enabled_flag).
    ii. In one example, it may be controlled by whether co-located residual samples of both chroma components have inverted signs (e.g., slice_joint_cbcr_sign_flag).
    iii. In one example, it may be controlled by whether current block is coded with inter mode or not.
  d. Whether to enable the proposed methods and/or how to enable the proposed methods may be dependent on the coding information of current block and/or neighboring (adjacent or non-adjacent) blocks, such as block dimension, slice type/picture type/temporal layer index/video content/color component/partitioning tree type/coded mode/transform information, etc. al.
    i. In one example, for blocks with width no greater than T1 and height no greater than T2, the proposed method may be applied.
    ii. In one example, for blocks with width no greater than T1 or height no greater than T2, the proposed method may be applied.
    iii. In one example, for blocks with width times height no greater than T3, the proposed method may be applied.
    iv. In one example, it may be controlled by whether current block is coded with JCCR mode equal or unequal to K (e.g., K=2).

Figure 13:
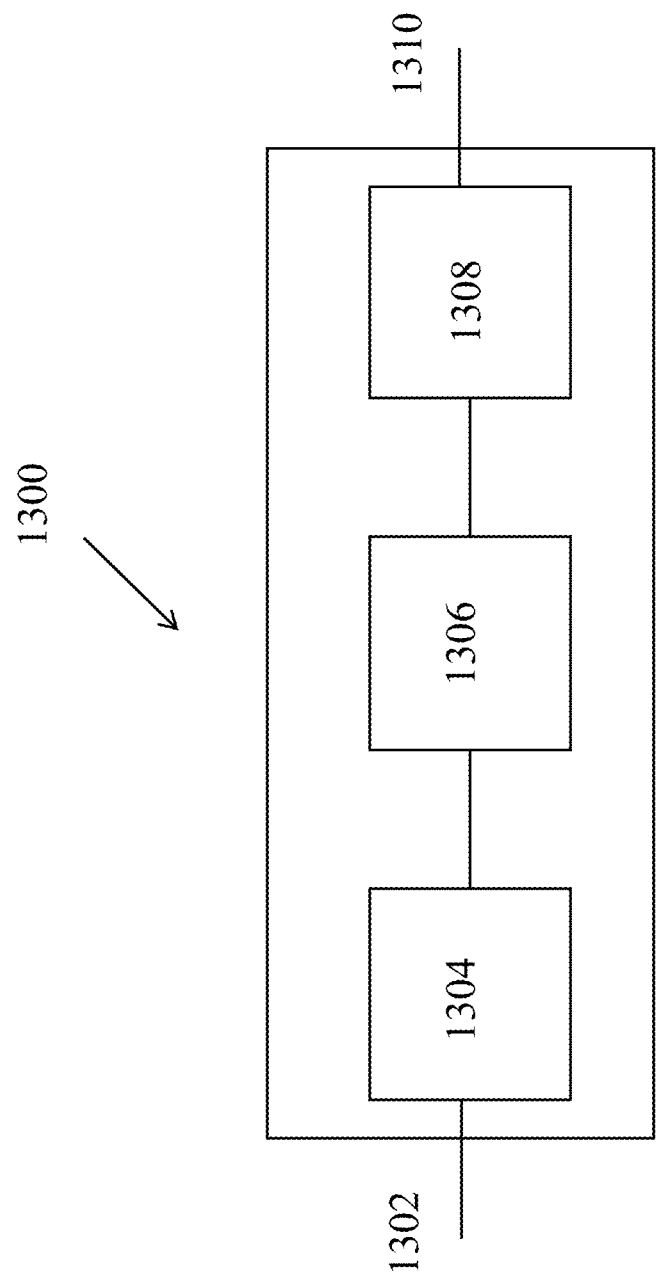
FIG. 13 is a block diagram of a video system.

FIG. 13 is a block diagram showing an example video processing system 1300 in which various techniques disclosed herein may be implemented. Various implementations may include some or all of the components of the system 1300. The system 1300 may include input 1302 for receiving video content. The video content may be received in a raw or uncompressed format, e.g., 8 or 10 bit multi-component pixel values, or may be in a compressed or encoded format. The input 1302 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1300 may include a coding component 1304 that may implement the various coding or encoding methods described in the present document. The coding component 1304 may reduce the average bitrate of video from the input 1302 to the output of the coding component 1304 to produce a coded representation of the video. The coding techniques are therefore sometimes called video compression or video transcoding techniques. The output of the coding component 1304 may be either stored, or transmitted via a communication connected, as represented by the component 1306. The stored or communicated bitstream (or coded) representation of the video received at the input 1302 may be used by the component 1308 for generating pixel values or displayable video that is sent to a display interface 1310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 14:
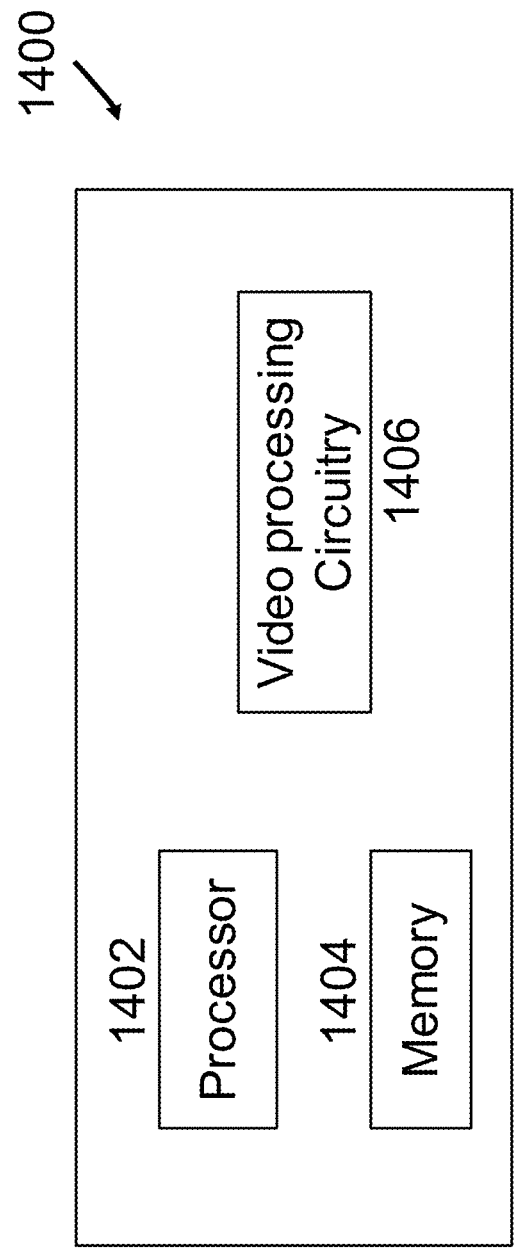
FIG. 14 is a block diagram of an example of a video processing apparatus.

FIG. 14 is a block diagram of a video processing apparatus 1400. The apparatus 1400 may be used to implement one or more of the methods described herein. The apparatus 1400 may be embodied in a smartphone, tablet, computer, Internet of Things (IoT) receiver, and so on. The apparatus 1400 may include one or more processors 1402, one or more memories 1404 and video processing hardware 1406. The processor(s) 1402 may be configured to implement one or more methods described in the present document. The memory (memories) 1404 may be used for storing data and code used for implementing the methods and techniques described herein. The video processing hardware 1406 may be used to implement, in hardware circuitry, some techniques described in the present document. In some implementations, the hardware 1406 may be partially or completely a part of the processor 1402, e.g., a graphics processor.

Figure 15:
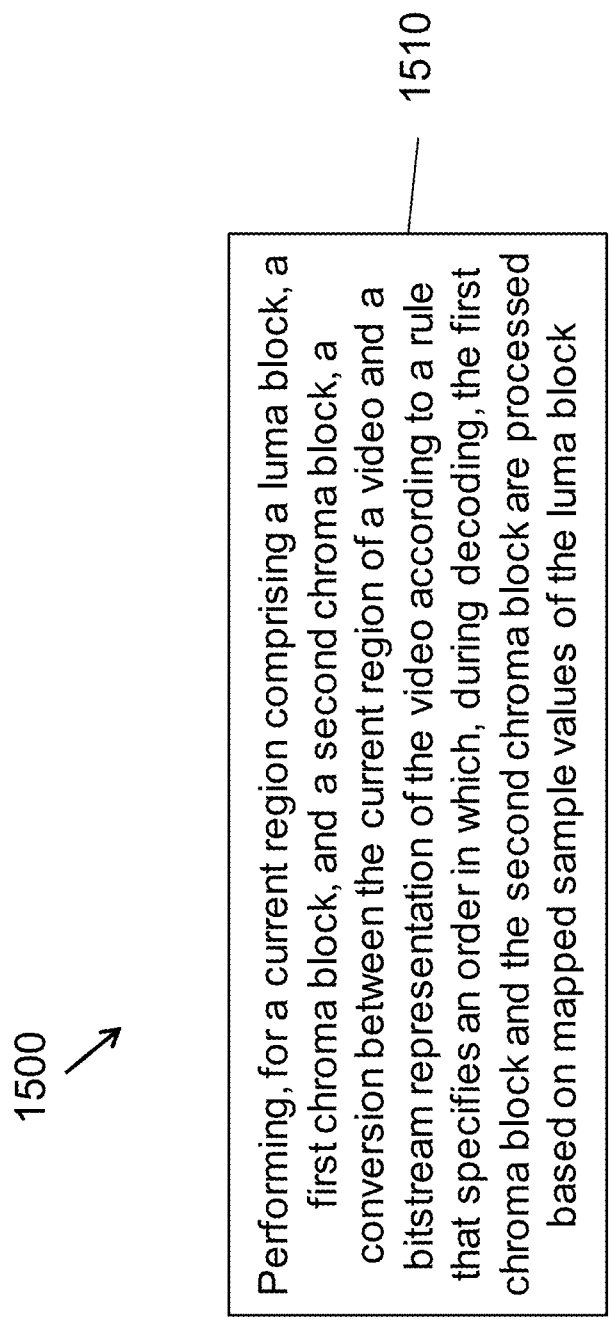
FIGS. 15-23 are flowcharts of example methods of video processing.

FIG. 15 is a flowchart of an example method 1500 of video processing. The method 1500 includes, at operation 1510, performing, for a current region comprising a luma block, a first chroma block, and a second chroma block, a conversion between the current region of a video and a bitstream representation of the video according to a rule that specifies an order in which, during decoding, the first chroma block and the second chroma block are processed based on mapped sample values of the luma block.

Figure 16:
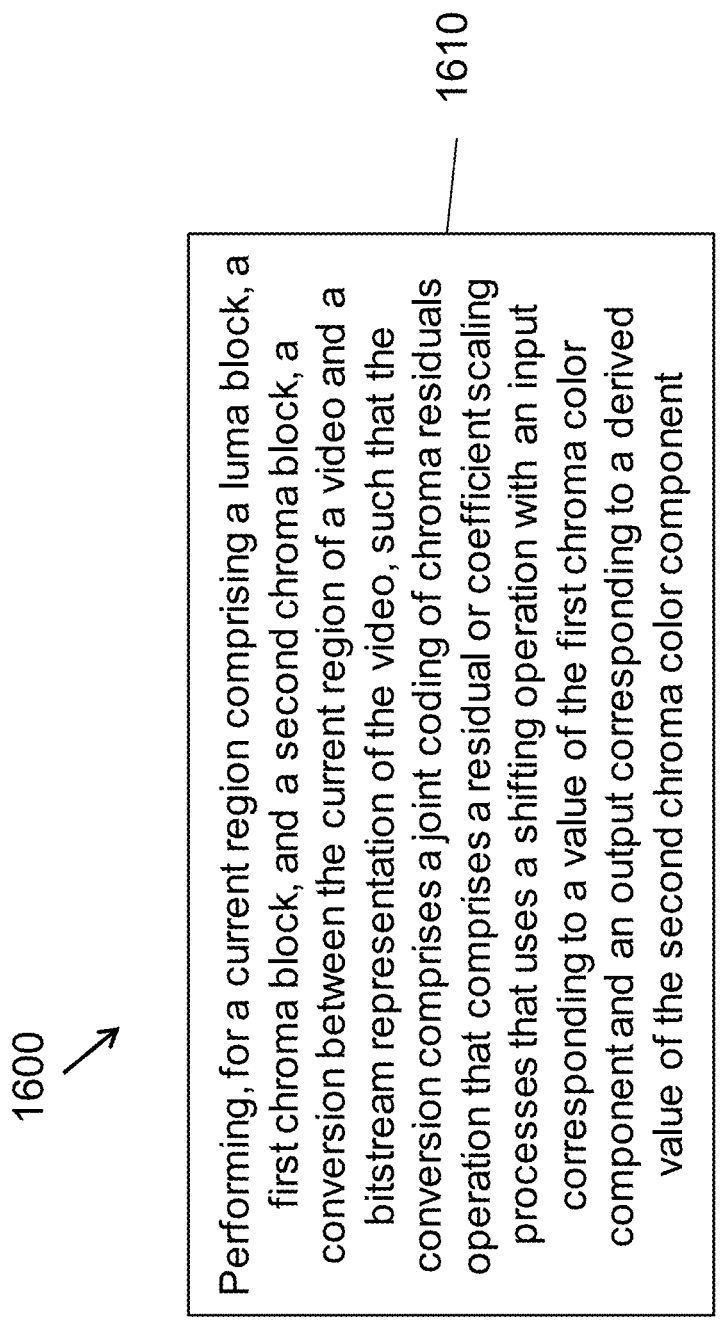

FIG. 16 is a flowchart of an example method 1600 of video processing. The method 1600 includes, at operation 1610, performing, for a current region comprising a luma block, a first chroma block, and a second chroma block, a conversion between the current region of a video and a bitstream representation of the video, such that the conversion comprises a joint coding of chroma residuals operation that comprises a residual or coefficient scaling processes that uses a shifting operation with an input corresponding to a value of the first chroma color component and an output corresponding to a derived value of the second chroma color component.

Figure 17:
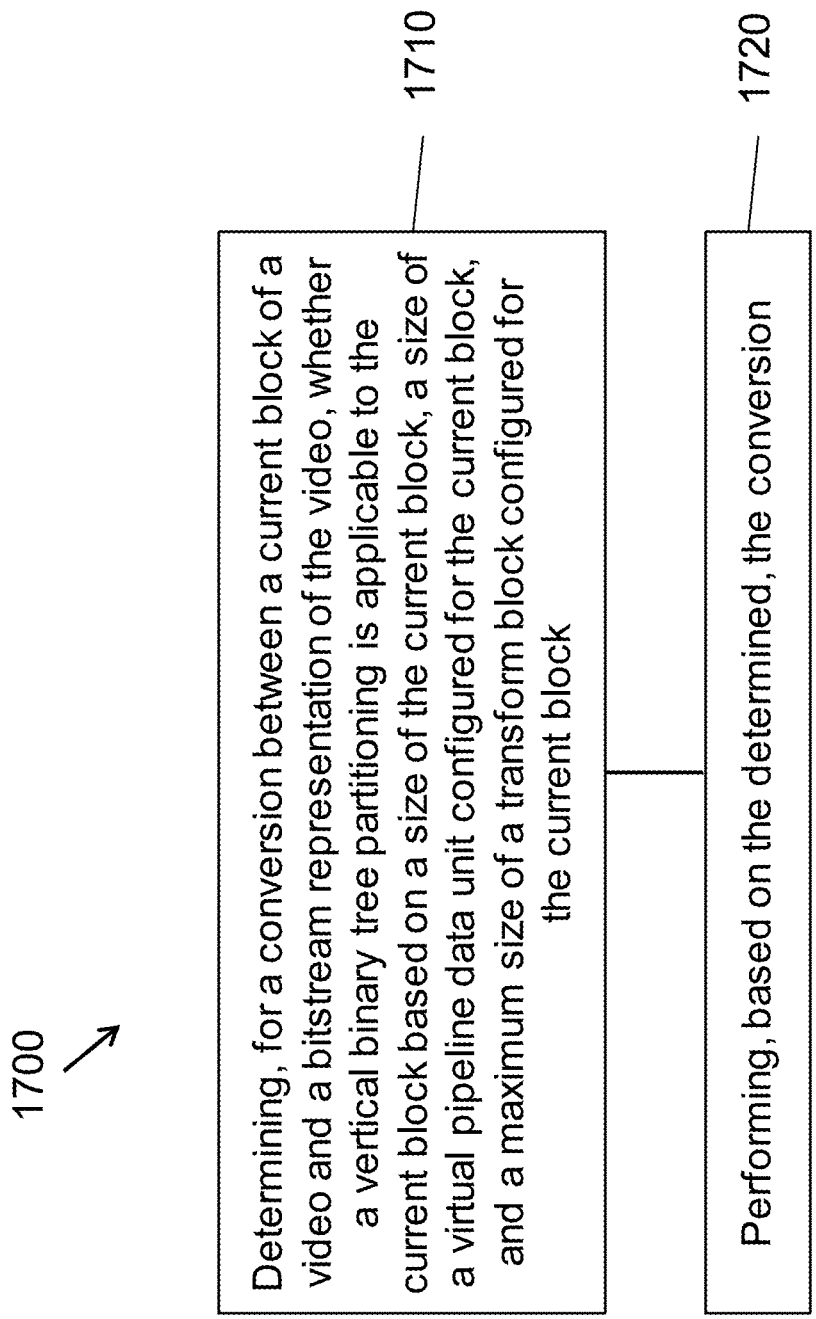

FIG. 17 is a flowchart of an example method 1700 of video processing. The method 1700 includes, at operation 1710, determining, for a conversion between a current block of a video and a bitstream representation of the video, whether a vertical binary tree partitioning is applicable to the current block based on a size of the current block, a size of a virtual pipeline data unit (VPDU) (denoted VpduSize) configured for the current block, and a maximum size of a transform block (denoted MaxTbSize) configured for the current block.

The method 1700 includes, at operation 1720, performing, based on the determined, the conversion.

Figure 18:
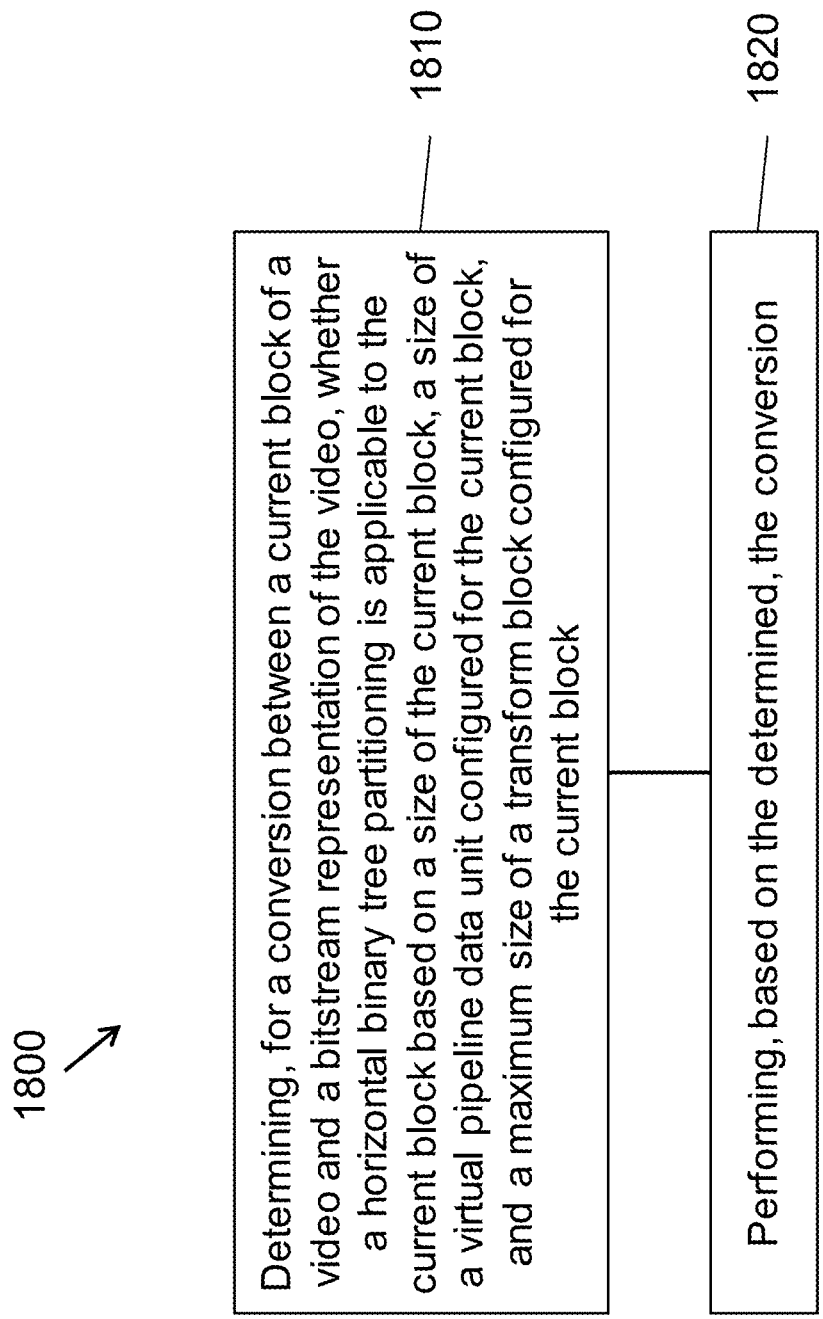

FIG. 18 is a flowchart of an example method 1800 of video processing. The method 1800 includes, at operation 1810, determining, for a conversion between a current block of a video and a bitstream representation of the video, whether a horizontal binary tree partitioning is applicable to the current block based on a size of the current block, a size of a virtual pipeline data unit (VPDU) (denoted VpduSize) configured for the current block, and a maximum size of a transform block (denoted MaxTbSize) configured for the current block.

The method 1800 includes, at operation 1820, performing, based on the determined, the conversion.

Figure 19:
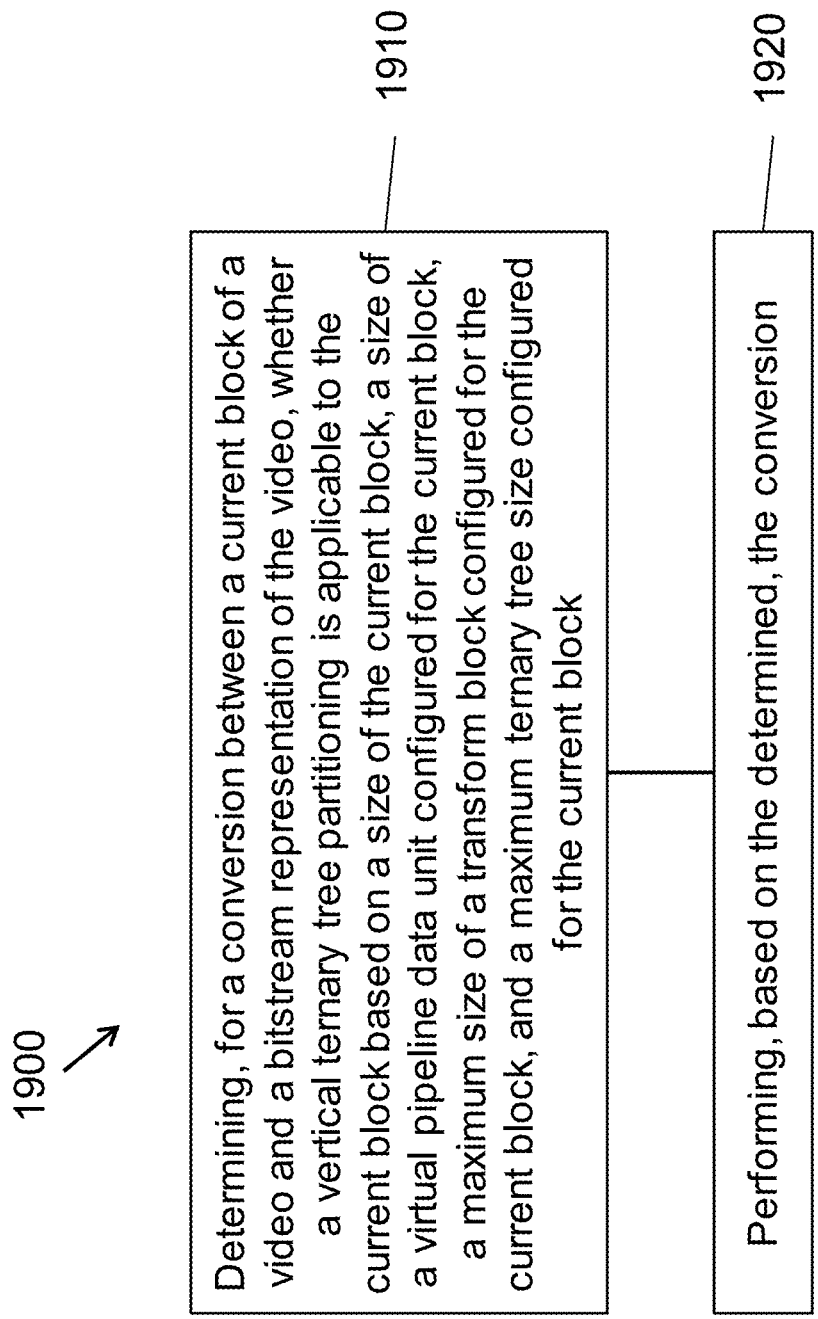

FIG. 19 is a flowchart of an example method 1900 of video processing. The method 1900 includes, at operation 1910, determining, for a conversion between a current block of a video and a bitstream representation of the video, whether a vertical ternary tree partitioning is applicable to the current block based on a size of the current block, a size of a virtual pipeline data unit (VPDU) (denoted VpduSize) configured for the current block, a maximum size of a transform block (denoted MaxTbSize) configured for the current block, and a maximum ternary tree size (denoted maxTtSize) configured for the current block.

The method 1900 includes, at operation 1920, performing, based on the determined, the conversion.

Figure 20:
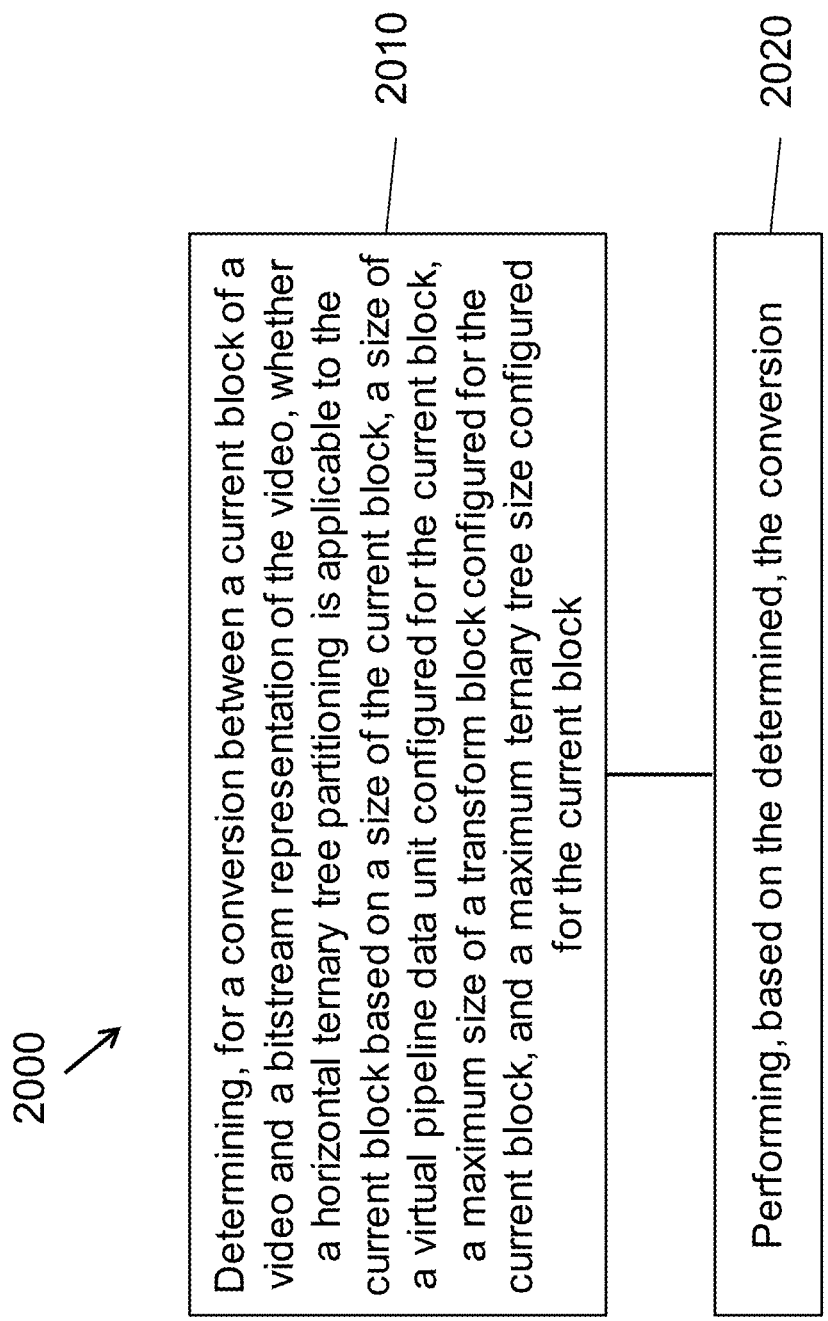

FIG. 20 is a flowchart of an example method 2000 of video processing. The method 2000 includes, at operation 2010, determining, for a conversion between a current block of a video and a bitstream representation of the video, whether a horizontal ternary tree partitioning is applicable to the current block based on a size of the current block, a size of a virtual pipeline data unit (VPDU) (denoted VpduSize) configured for the current block, a maximum size of a transform block (denoted MaxTbSize) configured for the current block, and a maximum ternary tree size (denoted maxTtSize) configured for the current block.

The method 2000 includes, at operation 2020, performing, based on the determined, the conversion.

Figure 21:
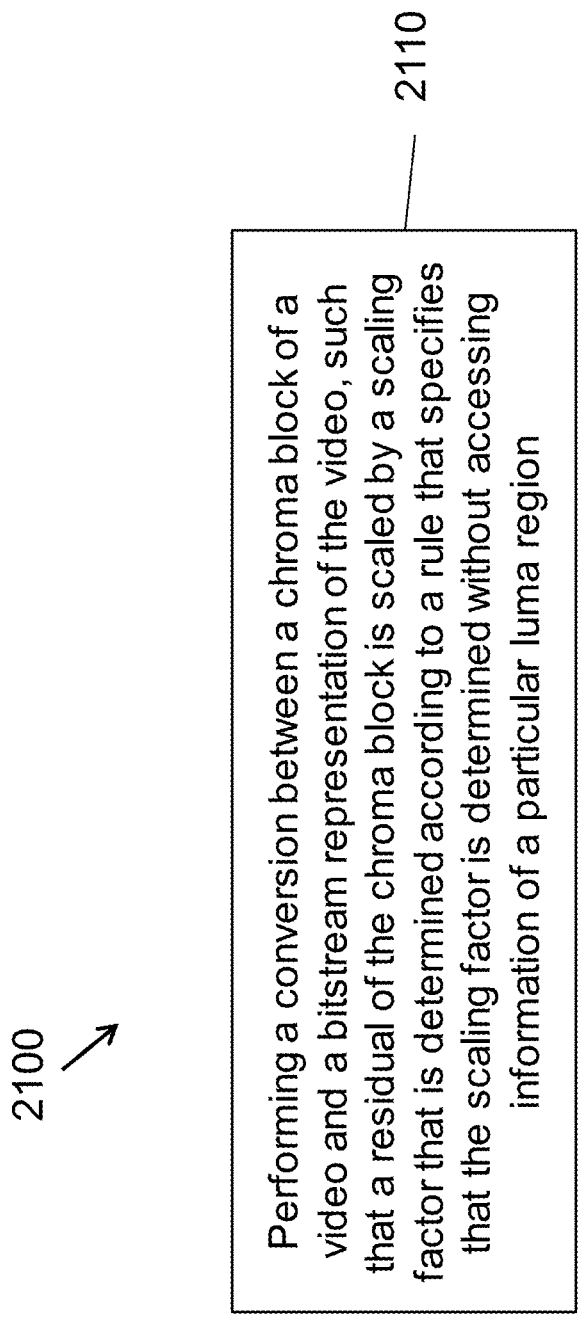

FIG. 21 is a flowchart of an example method 2100 of video processing. The method 2100 includes, at operation 2110, performing a conversion between a chroma block of a video and a bitstream representation of the video, such that a residual of the chroma block is scaled by a scaling factor that is determined according to a rule that specifies that the scaling factor is determined without accessing information of a particular luma region.

Figure 22:
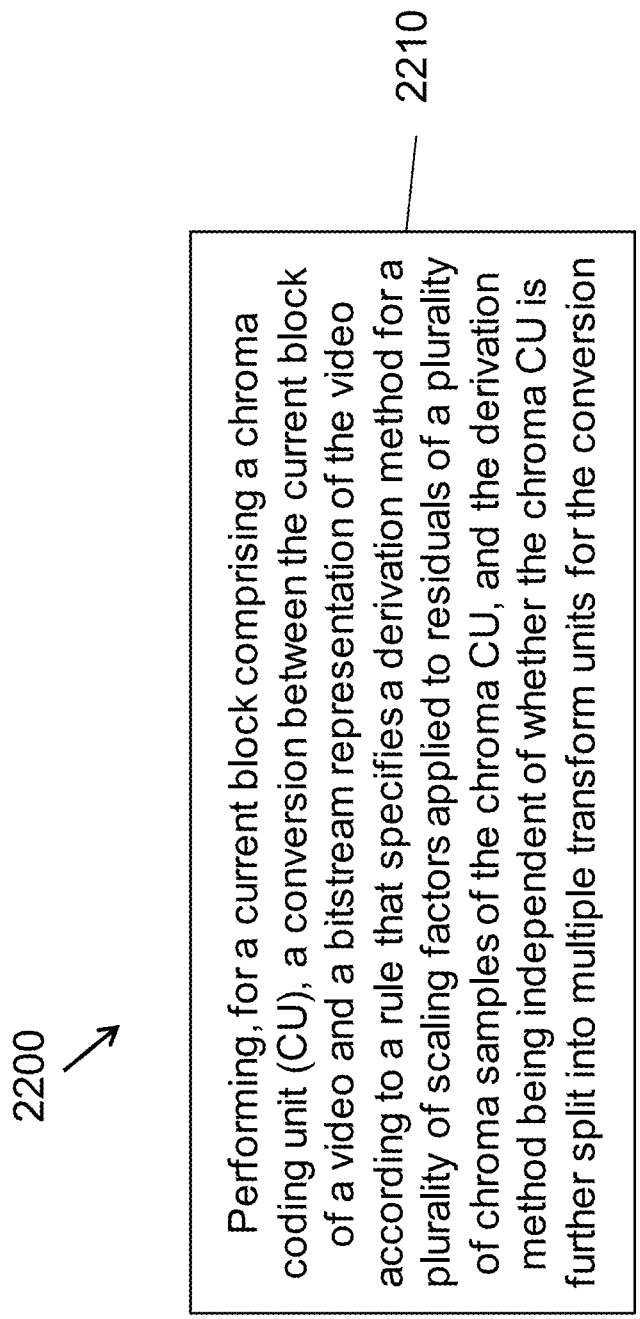

FIG. 22 is a flowchart of an example method 2200 of video processing. The method 2200 includes, at operation 2210, performing, for a current block comprising a chroma coding unit (CU), a conversion between the current block of a video and a bitstream representation of the video according to a rule that specifies a derivation method for a plurality of scaling factors applied to residuals of a plurality of chroma samples of the chroma CU, and the derivation method being independent of whether the chroma CU is further split into multiple transform units (TUs) for the conversion.

Figure 23:
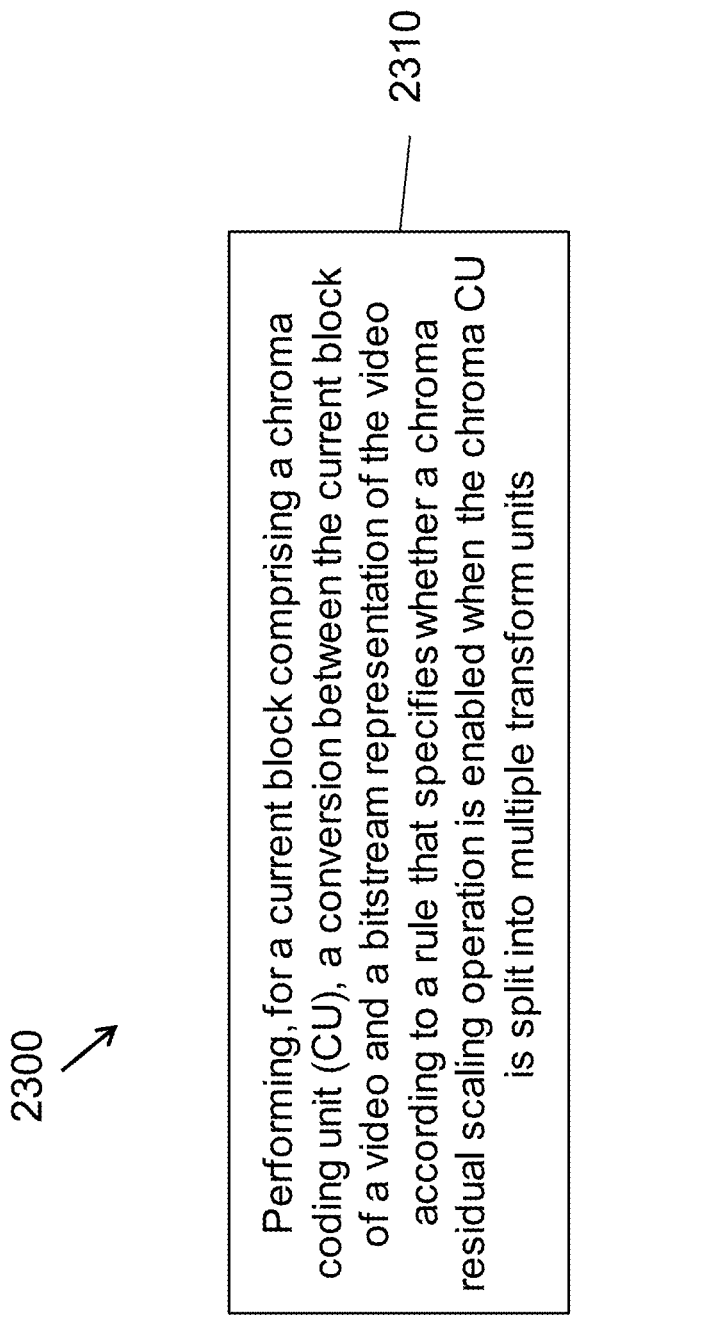

FIG. 23 is a flowchart of an example method 2300 of video processing. The method 2300 includes, at operation 2310, performing, for a current block comprising a chroma coding unit (CU), a conversion between the current block of a video and a bitstream representation of the video according to a rule that specifies whether a chroma residual scaling operation is enabled when the chroma CU is split into multiple transform units (TUs).

Figure 24:
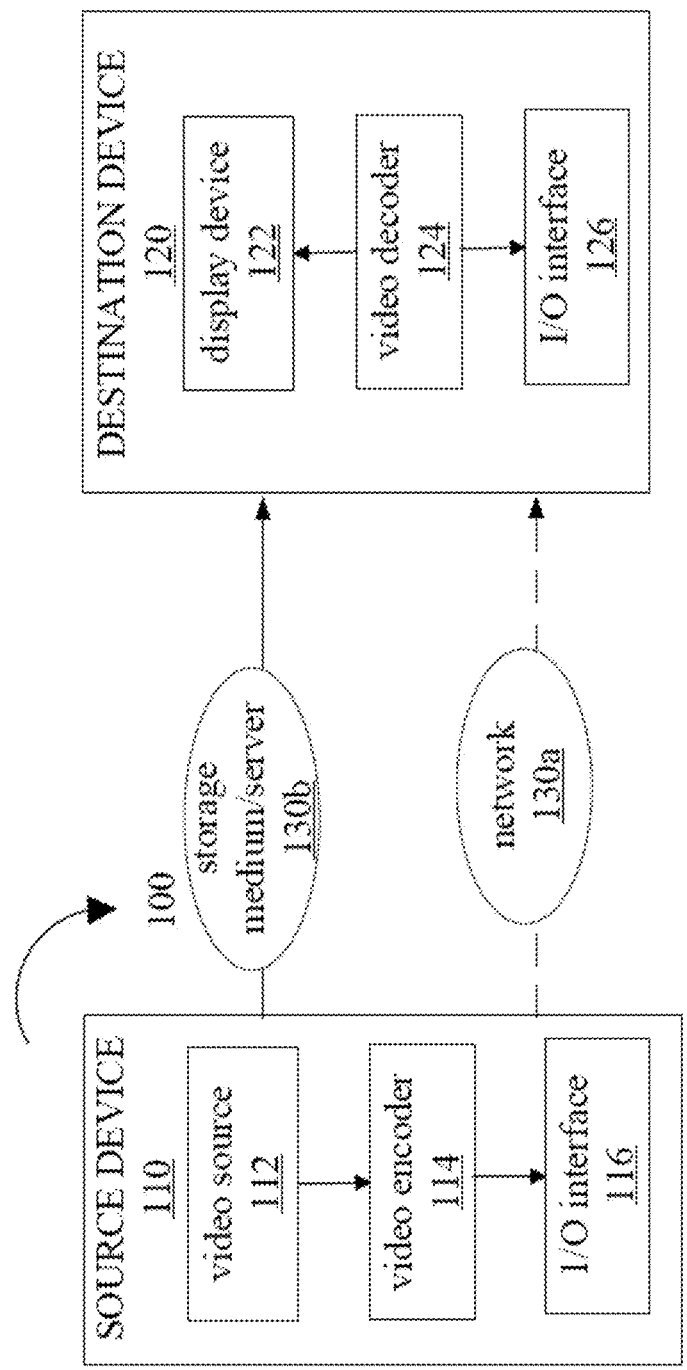
FIG. 24 is a block diagram that illustrates an example video coding system.

FIG. 24 is a block diagram that illustrates an example video coding system 100 that may utilize the techniques of this disclosure.

As shown in FIG. 24, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 25:
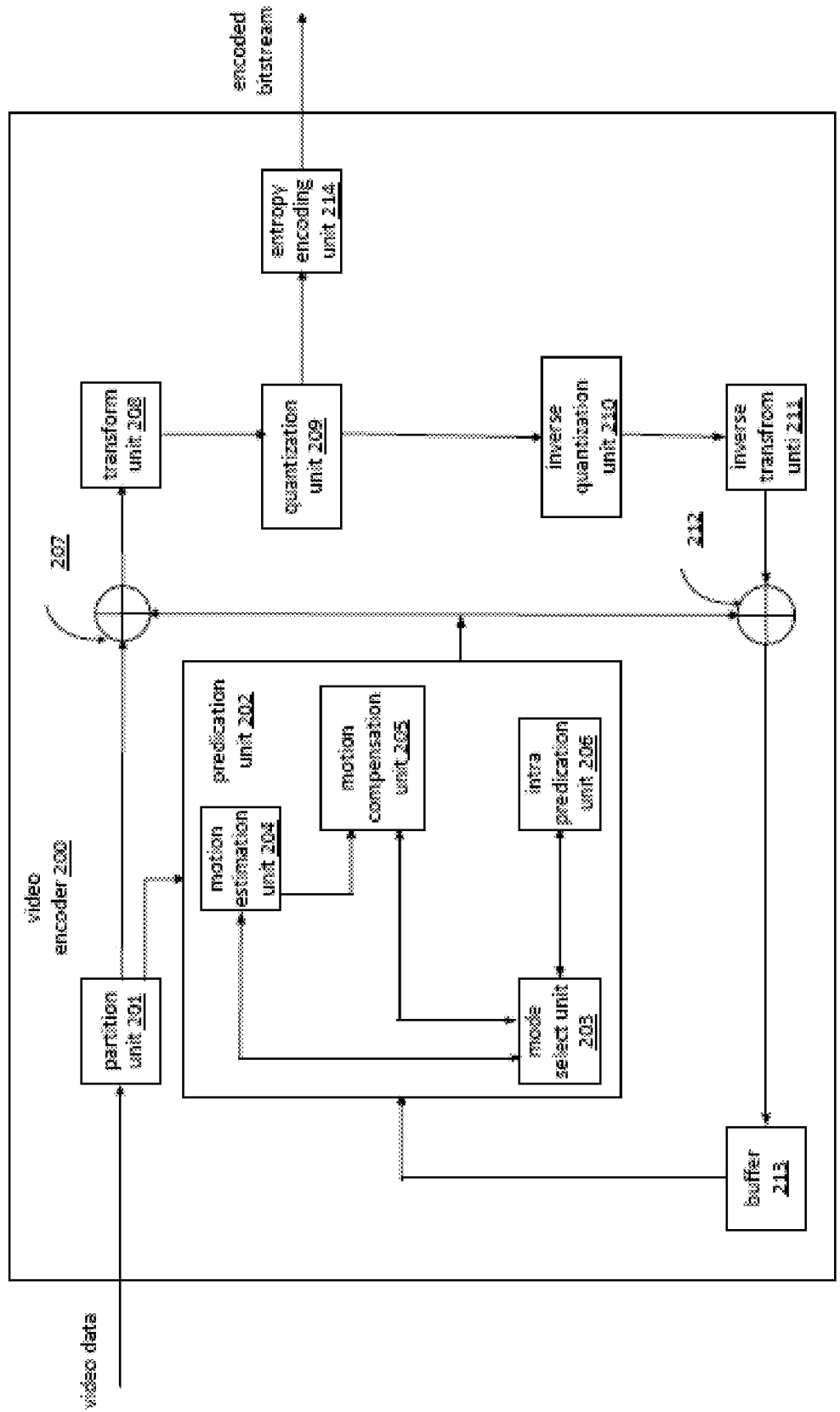
FIG. 25 is a block diagram that illustrates an encoder in accordance with some embodiments of the present disclosure.

FIG. 25 is a block diagram illustrating an example of video encoder 200, which may be video encoder 114 in the system 100 illustrated in FIG. 24.

Video encoder 200 may be configured to perform any or all of the techniques of this disclosure. In the example of FIG. 25, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 26:
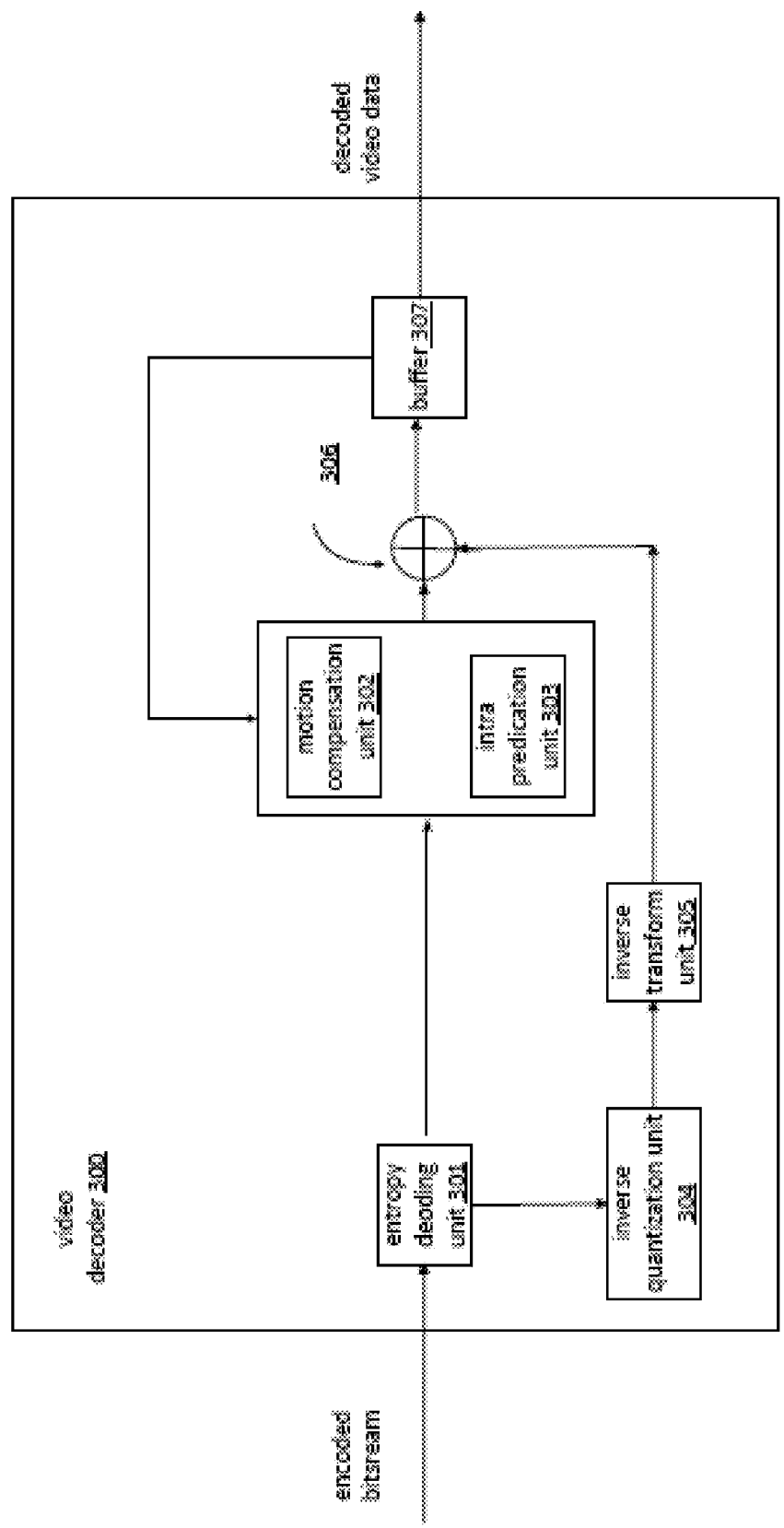
FIG. 26 is a block diagram that illustrates a decoder in accordance with some embodiments of the present disclosure.

FIG. 26 is a block diagram illustrating an example of video decoder 300 which may be video decoder 114 in the system 100 illustrated in FIG. 24.

The video decoder 300 may be configured to perform any or all of the techniques of this disclosure. In the example of FIG. 26, the video decoder 300 includes a plurality of functional components. The techniques described in this disclosure may be shared among the various components of the video decoder 300. In some examples, a processor may be configured to perform any or all of the techniques described in this disclosure.

In the example of FIG. 26, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 25).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation.

The following solutions may be implemented as preferred technical solutions in some embodiments.

A1. A method of video processing, comprising performing, for a current region comprising a luma block, a first chroma block, and a second chroma block, a conversion between the current region of a video and a bitstream representation of the video according to a rule that specifies an order in which, during decoding, the first chroma block and the second chroma block are processed based on mapped sample values of the luma block.

A2. The method of solution A1, wherein the first chroma block and the second chroma block corresponds to a first chroma color component of the video and a second chroma color component of the video, respectively, wherein the first chroma color component and the second chroma color component are in a same transform unit, and wherein the rule specifies that a chroma residual scaling process, associated with processing the first chroma block and the second chroma block, is applied to either the first chroma block or the second chroma block.

A3. The method of solution A2, wherein the rule specifies that a chroma residual scaling process, associated with processing the first chroma block and the second chroma block, is applied to the first chroma color component to derive a scaled chroma residual of the first chroma color component.

A4. The method of solution A3, wherein the rule further specifies that the scaled chroma residual of the first chroma color component is used to derive a scaled chroma residual of the second chroma color component.

A5. The method of solution A3, wherein the rule further specifies that a scaled chroma residual of the second chroma color component is derived based on side information related to a joint coding of chroma residuals (JCCR) operation.

A6. The method of solution A3, wherein the rule further specifies that a joint coding of chroma residuals (JCCR) operation is applied to the scaled chroma residual of the first chroma color component.

A7. The method of solution A5, wherein the rule further specifies that an inverse quantization operation and an inverse transform is applied to the first chroma color component prior to applying the chroma residual scaling process.

A8. The method of solution A7, wherein the rule further specifies applying a clipping operation to the scaled chroma residual of the second chroma color component.

A9. The method of solution A8, wherein an output range of the clipping operation is based on a bit-depth of the second chroma color component.

A10. The method of solution A9, wherein the output range is determined as $[-(1<<\text{BitDepth}_C), (1<<\text{BitDepth}_C)-1]$, wherein $\text{BitDepth}_C$ is the bit-depth of the second chroma color component.

A11. The method of solution A1, wherein the first chroma block and the second chroma block corresponds to a first chroma color component of the video and a second chroma color component of the video, respectively, and wherein the rule specifies that a chroma residual scaling process, associated with processing the first chroma block and the second chroma block, comprises a first step that determines a product between an input and a scaling factor, wherein the input comprises an input value or an absolute value of the input value, and a second step that applies a shifting operation to the input, wherein the shifting operation uses the scaling factor.

A12. The method of solution A11, wherein the shifting operation is defined as $\text{Shift}(x, s)=(x+\text{off})>>s$, wherein x is the input, s is the scaling factor, and off is a non-zero integer.

A13. The method of solution A12, wherein off=$(1<<(s-1))$.

A14. The method of solution A11, wherein the shifting operation is defined as $$\text{SignShift}(x, s) = \begin{cases} (x + \text{off}) \gg s & x \geq 0 \\ -((-x + \text{off}) \gg s) & x < 0 \end{cases},$$

wherein x is the input, s is the scaling factor, and off is an integer.

A15. The method of solution A14, wherein off=0 or off=$(1<<(s-1))$.

A16. The method of any of solutions A11 to 15, wherein the first chroma color component and the second chroma color component are in a same transform unit, and wherein the rule specifies that the first step is applied to either the first chroma block or the second chroma block.

A17. The method of solution A16, wherein the rule further specifies that an inverse quantization operation and an inverse transform is applied to the first chroma color component prior to applying the first step to generate a temporary chroma residual block of the first chroma color component.

A18. The method of solution A17, wherein the rule further specifies that a final residual block of the first chroma color component is generated, using the second step, based on the temporary chroma residual block of the first chroma color component.

A19. The method of solution A17, wherein the rule further specifies that a final residual block of the second chroma color component is generated based on the temporary chroma residual block of the first chroma color component.

A20. The method of solution A19, wherein the final residual block of the second chroma color component is generated further based on side information related to a joint coding of chroma residuals (JCCR) operation.

A21. The method of solution A20, wherein the side information comprises an indication of whether an invert sign is applied to video blocks coded with the JCCR operation.

A22. The method of solution A1, wherein the first chroma block and the second chroma block corresponds to a first chroma color component of the video and a second chroma color component of the video, respectively, and wherein the rule specifies that deriving coefficients of the second chroma color component are based on decoded coefficients of the first chroma color component.

A23. The method of solution A22, wherein deriving the coefficients of the second chroma color component are further based on side information related to a joint coding of chroma residuals (JCCR) operation.

A24. The method of solution A22, wherein the coefficients of the second chroma color component are derived after applying a joint coding of chroma residuals (JCCR) operation to the decoded coefficients of the first chroma color component.

A25. The method of any of solutions A1 to A24, wherein the first chroma color component is a Cb color component, and wherein the second chroma color component is a Cr color component.

A26. The method of any of solutions A1 to A24, wherein the first chroma color component is a Cr color component, and wherein the second chroma color component is a Cb color component.

A27. A method of video processing, comprising performing, for a current region comprising a luma block, a first chroma block, and a second chroma block, a conversion between the current region of a video and a bitstream representation of the video, wherein the conversion comprises a joint coding of chroma residuals (JCCR) operation, wherein the first chroma block and the second chroma block corresponds to a first chroma color component of the video and a second chroma color component of the video, respectively, and wherein the JCCR operation comprises a residual or coefficient scaling processes that uses a shifting operation with an input corresponding to a value of the first chroma color component and an output corresponding to a derived value of the second chroma color component.

A28. The method of solution A27, wherein the shifting operation is defined as Shift(x, s)=(x+off)>>s, wherein x is the input, s is a scaling factor, and off is a non-zero integer.

A29. The method of solution A27, wherein the shifting operation is defined as $$SignShift(x, s) = \begin{cases} (x + \text{off}) \gg s & x \geq 0 \\ -((-x + \text{off}) \gg s) & x < 0 \end{cases},$$

wherein x is the input, s is a scaling factor, and off is an integer.

A30. The method of solution A27, wherein the rule further specifies that the JCCR operation is applied to a chroma block coded with a predetermined mode.

A31. The method of solution A30, wherein the predetermined mode is a cross-component linear model (CCLM) prediction mode.

A32. The method of solution A30, wherein the predetermined mode is a direct mode that derives an intra prediction mode of the chroma block based on a corresponding luma block.

A33. The method of solution A30, wherein signaling for side information for the JCCR operation is excluded from the bitstream representation.

A34. The method of solution A27, wherein the JCCR operation is applied to a video block with a height (H) and a width (W) in chroma samples despite an indication of applying the JCCR operation being excluded from the bitstream representation.

A35. The method of solution A34, wherein W≤T1 and H≤T2, and wherein T1 and T2 are integer thresholds.

A36. The method of solution A34, wherein W×H≤T3, and wherein T3 is an integer threshold.

A37. The method of solution A34, wherein W≥T1 and H≥T2, and wherein T1 and T2 are integer thresholds.

A38. The method of solution A34, wherein W×H≥T3, and wherein T3 is an integer threshold.

A39. The method of solution A35 or A37, wherein T1 and T2 are pre-defined, signaled in the bitstream representation, or determined on-the-fly.

A40. The method of solution A35 or A37, wherein T1=4, 8, 16, 32, or 128, and T2=4, 8, 16, 32, or 128.

A41. The method of solution A36 or A38, wherein T3=4, 8, 16, 32, or 128.

A42. A method of video processing, comprising determining, for a conversion between a current block of a video and a bitstream representation of the video, whether a vertical binary tree partitioning is applicable to the current block based on a size of the current block, a size of a virtual pipeline data unit (VPDU) (denoted VpduSize) configured for the current block, and a maximum size of a transform block (denoted MaxTbSize) configured for the current block; and performing, based on the determined, the conversion.

A43. The method of solution A42, wherein the vertical binary tree partitioning is not applied to the current block when a width of the current block is less than or equal to VpduSize and a height of the current block is greater than VpduSize.

A44. The method of solution A43, wherein VpduSize=64.

A45. The method of solution A42, wherein the vertical binary tree partitioning is not applied to the current block when a width of the current block is less than or equal to max(VpduSize, MaxTbSize) and a height of the current block is greater than max(VpduSize, MaxTbSize).

A46. The method of solution A45, wherein VpduSize=64 and MaxTbSize=64.

A47. The method of solution A45, wherein VpduSize=64 and MaxTbSize=32.

A48. A method of video processing, comprising determining, for a conversion between a current block of a video and a bitstream representation of the video, whether a horizontal binary tree partitioning is applicable to the current block based on a size of the current block, a size of a virtual pipeline data unit (VPDU) (denoted VpduSize) configured for the current block, and a maximum size of a transform block (denoted MaxTbSize) configured for the current block; and performing, based on the determined, the conversion.

A49. The method of solution A48, wherein the horizontal binary tree partitioning is not applied to the current block when a height of the current block is less than or equal to VpduSize and a width of the current block is greater than VpduSize.

A50. The method of solution A49, wherein VpduSize=64.

A51. The method of solution A48, wherein the horizontal binary tree partitioning is not applied to the current block when a height of the current block is less than or equal to max(VpduSize, MaxTbSize) and a width of the current block is greater than max(VpduSize, MaxTbSize).

A52. The method of solution A51, wherein VpduSize=64 and MaxTbSize=64.

A53. The method of solution A51, wherein VpduSize=64 and MaxTbSize=32.

A54. A method of video processing, comprising determining, for a conversion between a current block of a video and a bitstream representation of the video, whether a vertical ternary tree partitioning is applicable to the current block based on a size of the current block, a size of a virtual pipeline data unit (VPDU) (denoted VpduSize) configured for the current block, a maximum size of a transform block (denoted MaxTbSize) configured for the current block, and a maximum ternary tree size (denoted maxTtSize) configured for the current block; and performing, based on the determined, the conversion.

A55. The method of solution A54, wherein the vertical ternary tree partitioning is not applied to the current block when a width of the current block or a height of the current block is greater than min(VpduSize, maxTtSize).

A56. The method of solution A55, wherein VpduSize=64.

A57. The method of solution A54, wherein the vertical ternary tree partitioning is not applied to the current block when a width of the current block or a height of the current block is greater than min(max(VpduSize, MaxTbSize), maxTtSize).

A58. The method of solution A57, wherein VpduSize=64 and MaxTbSize=64.

A59. The method of solution A57, wherein VpduSize=64 and MaxTbSize=32.

A60. A method of video processing, comprising determining, for a conversion between a current block of a video and a bitstream representation of the video, whether a horizontal ternary tree partitioning is applicable to the current block based on a size of the current block, a size of a virtual pipeline data unit (VPDU) (denoted VpduSize) configured for the current block, a maximum size of a transform block (denoted MaxTbSize) configured for the current block, and a maximum ternary tree size (denoted maxTtSize) configured for the current block; and performing, based on the determined, the conversion.

A61. The method of solution A60, wherein the horizontal ternary tree partitioning is not applied to the current block when a width of the current block or a height of the current block is greater than min(VpduSize, maxTtSize).

A62. The method of solution A61, wherein VpduSize=64.

A63. The method of solution A60, wherein the horizontal ternary tree partitioning is not applied to the current block when a width of the current block or a height of the current block is greater than min(max(VpduSize, MaxTbSize), maxTtSize).

A64. The method of solution A63, wherein VpduSize=64 and MaxTbSize=64.

A65. The method of solution A63, wherein VpduSize=64 and MaxTbSize=32.

A66. A method of video processing, comprising performing a conversion between a chroma block of a video and a bitstream representation of the video, wherein a residual of the chroma block is scaled by a scaling factor that is determined according to a rule that specifies that the scaling factor is determined without accessing information of a particular luma region.

A67. The method of solution A66, wherein the particular luma region corresponds to a luma coding unit that covers a corresponding luma sample of a representative chroma sample of the chroma block.

A68. The method of solution A66, wherein the particular luma region corresponds to a luma coding unit that covers luma samples corresponding to all chroma samples of the chroma block.

A69. The method of any of solutions A1 to A68, wherein performing the conversion comprises generating the bitstream representation from the current block or the current region.

A70. The method of any of solutions A1 to A68, wherein performing the conversion comprises generating the current block or the current region from the bitstream representation.

A71. An apparatus in a video system comprising a processor and a non-transitory memory with instructions thereon, wherein the instructions upon execution by the processor, cause the processor to implement the method recited in one or more of solutions A1 to A70.

A72. A computer program product stored on a non-transitory computer readable media, the computer program product including program code for carrying out the method recited in one or more of solutions A1 to A70.

A73. A computer readable medium that stores the bitstream representation generated according to the method recited in one or more of solutions A1 to A70.

The following additional solutions may be implemented as preferred technical solutions in some embodiments.

B1. A method of video processing, comprising performing, for a current block comprising a chroma coding unit (CU), a conversion between the current block of a video and a bitstream representation of the video according to a rule, wherein the rule specifies a derivation method for a plurality of scaling factors applied to residuals of a plurality of chroma samples of the chroma CU, and wherein the derivation method is independent of whether the chroma CU is further split into multiple transform units (TUs) for the conversion.

B2. The method of solution B1, wherein the rule specifies that the plurality of scaling factors are identical regardless of whether the chroma CU is split into multiple transform units (TUs).

B3. The method of solution B1, wherein the rule specifies that the derivation method for each of the plurality of scaling factors is based on an identical set of luma reconstructed samples regardless of whether the chroma CU is split into multiple transform units (TUs).

B4. The method of solution B1, wherein the rule specifies that the derivation method for each of the plurality of scaling factors is based on an identical set of luma reconstructed samples that are not part of a luma CU that corresponds to the chroma CU.

B5. A method of video processing, comprising performing, for a current block comprising a chroma coding unit (CU), a conversion between the current block of a video and a bitstream representation of the video according to a rule, wherein the rule specifies whether a chroma residual scaling operation is enabled when the chroma CU is split into multiple transform units (TUs).

B6. The method of solution B5, wherein the rule specifies that the chroma residual scaling operation is applied to a subset of the multiple TUs.

B7. The method of solution B6, wherein the subset of the multiple TUs comprise TUs at a top boundary of the chroma CU.

B8. The method of solution B5, wherein the rule specifies that the chroma residual scaling operation is disabled.

B9. The method of any of solutions B1 to B8, wherein the rule further specifies that a size of the chroma CU is greater than a size of a maximum transform block (TB).

B10. The method of any of solution B1 to B9, wherein an indication of an application of the rule is signaled in the bitstream representation.

B11. The method of solution B10, wherein the indication is signaled at a tile level, a brick level, a slice level, a picture level, a sub-picture level, a sequence level, or a view level.

B12. The method of solution B10, wherein the indication is signaled in a sequence parameter set (SPS), a view parameter set, an adaptation parameter set (APS), a picture parameter set (PPS), a picture header, or a slice header.

B13. The method of any of solutions B1 to B9, wherein an application of the rule is based on one or more syntax elements in the bitstream representation.

B14. The method of solution B13, wherein the application of the rule is based on whether a joint coding of chroma residuals (JCCR) operation is enabled, and wherein the one or more syntax elements comprises sps_joint_cbcr_enabled_ flag.

B15. The method of solution B13, wherein the application of the rule is based on whether co-located residual samples of both chroma components of the video have inverted signs, and wherein the one or more syntax elements comprises slice_joint_cbcr_sign_flag.

B16. The method of solution B13, wherein the application of the rule is based on whether the current block is coded with an inter mode.

B17. The method of any of solutions B1 to B9, wherein an application of the rule is based on coding information of the current block or a neighboring block.

B18. The method of solution B17, wherein the coding information comprises at least one of a block dimension, a slice type, a picture type, a temporal layer index, a content of the video, a color component of the video, a partitioning tree type of the current block, a coding mode, or a transform information.

B19. The method of solution B17 or B18, wherein the rule is applied when a width of the current block is less than or equal to T1 or a height of the current block is less than or equal to T2, and wherein T1 and T2 are integer thresholds.

B20. The method of solution B17 or B18, wherein the rule is applied when a product of a width of the current block and a height of the current block is less than or equal to T3, wherein T3 is an integer threshold.

B21. The method of solution B17 or B18, wherein the application of the rule is based on whether the current block is coded with a joint coding of chroma residuals (JCCR) mode equal to K, and wherein K is an integer.

B22. The method of solution B21, wherein K=2.

B23. The method of solution B21, wherein K≠2.

B24. The method of any of solutions B1 to B23, wherein performing the conversion comprises generating the bitstream representation from the current block.

B25. The method of any of solutions B1 to B23, wherein performing the conversion comprises generating the current block from the bitstream representation.

B26. An apparatus in a video system comprising a processor and a non-transitory memory with instructions thereon, wherein the instructions upon execution by the processor, cause the processor to implement the method recited in one or more of solutions B1 to B25.

B27. A computer program product stored on a non-transitory computer readable media, the computer program product including program code for carrying out the method recited in one or more of solutions B1 to B25.

B28. A computer readable medium that stores the bitstream representation generated according to the method recited in one or more of solutions B1 to B25.

In the above technical solutions, the performing the conversion includes using the results of previous decision step (e.g., using or not using certain coding or decoding steps) during the encoding or decoding operation to arrive at the conversion results. In the above-described solutions, video processing may include video coding or encoding or compressing or transcoding (changing from one format or bitrate to another format or bitrate), decoding or decompressing. Furthermore, these solutions may be applied to other visual data such as images.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    determining, for a conversion between a first block of a video and a bitstream of the video, whether a first partitioning process that splits the first block into two sub-blocks in a horizontal direction or a vertical direction is allowed to the first block based on a size of the first block and a size threshold; and
    performing, based on the determining, the conversion,
    wherein the first partitioning process in the vertical direction is disabled in a case where (i) a width of the first block is less than or equal to the size threshold and (ii) a height of the first block is greater than the size threshold.

2. The method of claim 1, wherein the first partitioning process in the horizontal direction is disabled in a case where (i) a height of the first block is less than or equal to the size threshold and (ii) a width of the first block is greater than the size threshold.

3. The method of claim 1, wherein the size threshold is equal to a size of a virtual pipeline data unit configured for the first block.

4. The method of claim 3, wherein the size of the virtual pipeline data unit is equal to 64.

5. The method of claim 1, wherein the size threshold is equal to 64.

6. The method of claim 1, wherein the first partitioning process comprises a binary tree (BT) partition.

7. The method of claim 1, further comprising:
    determining, for a second block of the video, whether a second partitioning process that splits the second block into three sub-blocks in a horizontal direction or a vertical direction is allowed to the second block based on a size of the second block, the size threshold and a maximum ternary tree size for the second block.

8. The method of claim 7, wherein the second partitioning process is disabled in a case where (i) a width of the second block is greater than a minimum value of the size threshold and the maximum ternary tree size or (ii) a height of the second block is greater than is greater than the minimum value.

9. The method of claim 1, wherein the conversion comprises encoding the video into the bitstream.

10. The method of claim 1, wherein the conversion comprises decoding the video from the bitstream.

11. An apparatus for processing video data comprising a processor and a non-transitory memory with instructions thereon, wherein the instructions upon execution by the processor, cause the processor to:
    determine, for a conversion between a first block of a video and a bitstream of the video, whether a first partitioning process that splits the first block into two sub-blocks in a horizontal direction or a vertical direction is allowed to the first block based on a size of the first block and a size threshold; and
    perform, based on the determining, the conversion,
    wherein the first partitioning process in the vertical direction is disabled in a case where (i) a width of the first block is less than or equal to the size threshold and (ii) a height of the first block is greater than the size threshold.

12. The apparatus of claim 11, wherein the first partitioning process in the horizontal direction is disabled in a case where (i) a height of the first block is less than or equal to the size threshold and (ii) a width of the first block is greater than the size threshold.

13. The apparatus of claim 11, wherein the size threshold is equal to a size of a virtual pipeline data unit configured for the first block, and wherein the size of the virtual pipeline data unit is equal to 64.

14. A non-transitory computer-readable storage medium storing instructions that cause a processor to:
    determine, for a conversion between a first block of a video and a bitstream of the video, whether a first partitioning process that splits the first block into two sub-blocks in a horizontal direction or a vertical direction is allowed to the first block based on a size of the first block and a size threshold; and
    perform, based on the determining, the conversion,
    wherein the first partitioning process in the vertical direction is disabled in a case where (i) a width of the first block is less than or equal to the size threshold and (ii) a height of the first block is greater than the size threshold.

15. The non-transitory computer-readable storage medium of claim 14, wherein
the first partitioning process in the horizontal direction is disabled in a case where (i) a height of the first block is less than or equal to the size threshold and (ii) a width of the first block is greater than the size threshold.

16. The non-transitory computer-readable storage medium of claim 15, wherein the size threshold is equal to a size of a virtual pipeline data unit configured for the first block, and wherein the size of the virtual pipeline data unit is equal to 64.

17. A non-transitory computer-readable recording medium storing a bitstream of a video which is generated by a method performed by a video processing apparatus, wherein the method comprises:
determining, for a first block of the video, whether a first partitioning process that splits the first block into two sub-blocks in a horizontal direction or a vertical direction is allowed to the first block based on a size of the first block and a size threshold; and
generating the bitstream based on the determining,
wherein the first partitioning process in the vertical direction is disabled in a case where (i) a width of the first block is less than or equal to the size threshold and (ii) a height of the first block is greater than the size threshold.

18. The non-transitory computer-readable recording medium of claim 17, wherein
the first partitioning process in the horizontal direction is disabled in a case where (i) a height of the first block is less than or equal to the size threshold and (ii) a width of the first block is greater than the size threshold.

19. The non-transitory computer-readable recording medium of claim 18, wherein the size threshold is equal to a size of a virtual pipeline data unit configured for the first block, and wherein the size of the virtual pipeline data unit is equal to 64.

20. The apparatus of claim 11, wherein the first partitioning process comprises a binary tree (BT) partition.

* * * * *